US011218520B2

(12) United States Patent
Araki

(10) Patent No.: US 11,218,520 B2
(45) Date of Patent: Jan. 4, 2022

(54) INFORMATION PROCESSING APPARATUS, INFORMATION PROCESSING SYSTEM, AND INFORMATION PROCESSING METHOD

(71) Applicant: Shigeo Araki, Kanagawa (JP)

(72) Inventor: Shigeo Araki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 52 days.

(21) Appl. No.: 16/909,188

(22) Filed: Jun. 23, 2020

(65) Prior Publication Data

US 2020/0412778 A1 Dec. 31, 2020

(30) Foreign Application Priority Data

Jun. 25, 2019 (JP) .............................. JP2019-117789
Oct. 11, 2019 (JP) .............................. JP2019-188145
Apr. 30, 2020 (JP) .............................. JP2020-080819

(51) Int. Cl.
*G06Q 10/10* (2012.01)
*H04L 29/06* (2006.01)
*H04L 12/18* (2006.01)

(52) U.S. Cl.
CPC ..... *H04L 65/4015* (2013.01); *G06Q 10/1093* (2013.01); *H04L 12/1818* (2013.01); *H04L 12/1822* (2013.01); *H04L 65/403* (2013.01)

(58) Field of Classification Search
CPC ............. H04L 65/4015; H04L 12/1818; H04L 12/1822; H04L 65/403; G06Q 10/1093; G06Q 10/1095; G06Q 10/103
See application file for complete search history.

(56) References Cited

U.S. PATENT DOCUMENTS

| | | | |
|---|---|---|---|
| 9,401,938 B2* | 7/2016 | Bakaev | .................. H04L 67/36 |
| 2002/0156808 A1 | 10/2002 | Duffy et al. | |
| 2003/0065722 A1 | 4/2003 | Ieperen | |
| 2004/0128354 A1 | 7/2004 | Horikiri et al. | |
| 2007/0198637 A1 | 8/2007 | Deboy et al. | |
| 2009/0268009 A1 | 10/2009 | Oya | |
| 2009/0319916 A1 | 12/2009 | Gudipaty et al. | |
| 2012/0303452 A1* | 11/2012 | Xue | ....................... H04L 51/02 |
| | | | 705/14.49 |
| 2014/0032550 A1* | 1/2014 | Park | ....................... G06F 16/22 |
| | | | 707/736 |
| 2015/0149929 A1 | 5/2015 | Shepherd et al. | |
| 2015/0153944 A1* | 6/2015 | Loretan | ................. G06F 3/0488 |
| | | | 715/786 |

(Continued)

FOREIGN PATENT DOCUMENTS

| | | |
|---|---|---|
| JP | 2006-005590 | 1/2006 |
| JP | 2010-072784 | 4/2010 |
| WO | 2011/136789 | 11/2011 |

OTHER PUBLICATIONS

Extended European Search Report for 20181546.1 dated Aug. 25, 2020.

*Primary Examiner* — Michael A Keller
(74) *Attorney, Agent, or Firm* — IPUSA, PLLC

(57) ABSTRACT

An information processing apparatus, an information processing system, and an information processing method. The information processing apparatus detects a user, acquires schedule information of the user based on the detected user, and suggests one or more shared sites to use according to the schedule information.

11 Claims, 27 Drawing Sheets

(56) References Cited

U.S. PATENT DOCUMENTS

| | | | |
|---|---|---|---|
| 2016/0285842 A1* | 9/2016 | Booth | H04W 4/029 |
| 2018/0067700 A1 | 3/2018 | Araki | |
| 2018/0121084 A1 | 5/2018 | Sakamoto et al. | |
| 2019/0020770 A1 | 1/2019 | Araki | |
| 2019/0384536 A1 | 12/2019 | Araki | |
| 2019/0387033 A1 | 12/2019 | Araki | |
| 2020/0379616 A1* | 12/2020 | Hshieh | G06F 16/24578 |

* cited by examiner

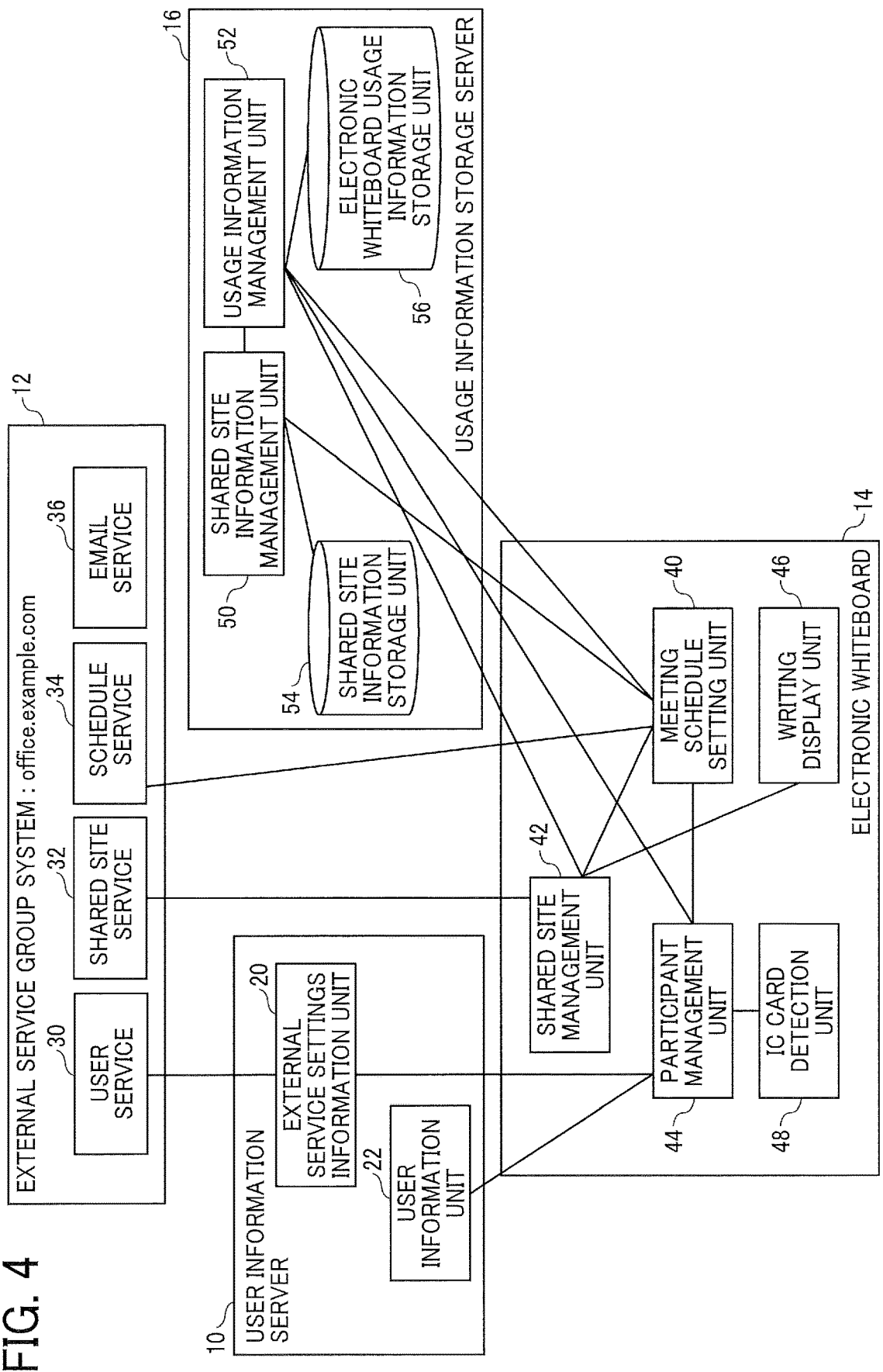

FIG. 5

| USER ID | NAME | EMAIL ADDRESS |
|---|---|---|
| office1 | Mary | office1@office.example.com |
| office2 | Sato | office2@office.example.com |
| office3 | Saito | office3@office.example.com |
| office4 | Itoh | office4@office.example.com |
| office5 | Suzuki | office5@office.example.com |
| office6 | Kondoh | office6@office.example.com |
| ... | ... | ... |

FIG. 6

| SCHED-ULE ID | SCHEDULE NAME | SCHEDULE TYPE | SCHEDULE OWNER | START TIME AND PERIOD | INVITEE |
|---|---|---|---|---|---|
| sch-1 | Launch Plan | Meeting | office5 | November 10, 2018 12:00-13:00 | office1 (Mary), office2 (Sato), office5 (Suzuki) |
| sch-2 | Launch Plan | Meeting | office1 | November 10, 2018 15:00-15:30 | office1 (Mary), office3 (Saito) office4 (Itoh), |
| sch-3 | Launch Plan | Meeting | office1 | November 12, 2018 15:00-15:30 | office1 (Mary), office3 (Saito) office4 (Itoh), office6 (Kondoh) |

FIG. 7

| USER ID | NAME | EMAIL ADDRESS | EXTERNAL SERVICE SETTING ID | IDENTIFICATION INFORMATION |
|---|---|---|---|---|
| user001 | Mary Smith | mary@intra.example.com | connect1a | ICCARD-123 |
| user002 | Sato Ayumu | sato@intra.example.com | connect2a | ICCARD-248 |
| user003 | Saito Ichiro | saito@intra.example.com | connect3a | ICCARD-255 |
| user004 | Itoh Ichiro | itoh@intra.example.com | connect4a | ICCARD-260 |
| user005 | Suzuki Kei | suzuki@intra.example.com | connect5a | ICCARD-279 |
| user006 | Kudoh Shin | kudoh@intra.example.com | connect6a | ICCARD-281 |
| ... | ... | ... | ... | ... |

FIG. 8

| EXTERNAL SERVICE SETTING ID | USER ID | ADDRESS INFORMATION | EXTERNAL SERVICE USER ID | EXTERNAL SERVICE AUTHENTICATION TOKEN |
|---|---|---|---|---|
| connect1a | user001 | office.example.com | office1 | eyJhbGc11··· |
| connect2a | user002 | office.example.com | office2 | eyJhbGc12··· |
| connect3a | user003 | office.example.com | office3 | eyJhbGc13··· |
| connect4a | user004 | office.example.com | office4 | eyJhbGc14··· |
| connect5a | user005 | office.example.com | office5 | eyJhbGc15··· |
| connect6a | user006 | office.example.com | office6 | eyJhbGc16··· |
| ... | ... | ... | ... | ... |

FIG. 9

| USER ID | ORGAN-IZER | EXTERNAL SERVICE SETTINGS INFORMATION | EMAIL ADDRESS |
|---|---|---|---|
| user001 | Yes | EXTERNAL SERVICE SETTING INFORMATION(connect1a) | office1@office.example.com |
| user002 | No | EXTERNAL SERVICE SETTING INFORMATION(connect2a) | office2@office.example.com |
| user005 | No | EXTERNAL SERVICE SETTING INFORMATION(connect5a) | office5@office.example.com |

FIG. 10

| DEVICE ID | DATE AND TIME | EVENT |
|---|---|---|
| K100029 | NOVEMBER 10, 2018 12:01 | Start meeting |
| | NOVEMBER 10, 2018 12:01 | Add user user001 |
| | NOVEMBER 10, 2018 12:02 | Schedule Set Launch Plan |
| | NOVEMBER 10, 2018 12:02 | Schedule Owner is user005 |
| | NOVEMBER 10, 2018 12:02 | Add user user002 |
| | NOVEMBER 10, 2018 12:02 | Add user user005 |
| | NOVEMBER 10, 2018 12:05 | Select site Abc Tech |
| | NOVEMBER 10, 2018 12:08 | Load from/Drawings |
| | NOVEMBER 10, 2018 12:49 | Save to/Drawings |
| | NOVEMBER 10, 2018 12:50 | End meeting |
| | NOVEMBER 10, 2018 15:01 | Start meeting |
| | NOVEMBER 10, 2018 15:01 | Add user user001 |
| | NOVEMBER 10, 2018 15:02 | Schedule Set Launch Plan |
| | NOVEMBER 10, 2018 15:02 | Schedule Owner is user001 |
| | NOVEMBER 10, 2018 15:02 | Add user user003 |
| | NOVEMBER 10, 2018 15:02 | Add user user004 |
| | NOVEMBER 10, 2018 15:05 | Select site Abc Project |
| | NOVEMBER 10, 2018 15:10 | Load from/Materials/Draft |
| | NOVEMBER 10, 2018 15:54 | Save to/Materials/Temp |
| | NOVEMBER 10, 2018 15:55 | End meeting |
| K100055 | ... | ... |
| ... | ... | ... |

FIG. 11

| SHARED SITE NAME | SCHEDULE NAME | SCHEDULE OWNER | PARTI-CIPANT | LATEST USAGE DATE AND TIME | NUMBER OF USAGES | LOAD PATH | SAVE PATH |
|---|---|---|---|---|---|---|---|
| Abc Project | Launch Plan | user001 | user001, user003, user004 | NOVEMBER 10, 2018 15:55 | 1 | /Materials/Draft | /Materials/Temp |
|  | ... | ... | ... | ... | ... |  |  |
| Abc Tech | Launch Plan | user005 | user001, user002, user005 | NOVEMBER 10, 2018 12:50 | 1 | /Drawings | /Drawings |
|  | ... | ... | ... | ... | ... |  |  |

FIG. 12

```
{
  primary:"Abc Project",
  site_name:[
  "Abc Project",
  "Abc Tech"
  ]
  Abc Project:{
     save_path:"/Material/Temp"
     load_path:"/Material/Draft"
  },
  Abc Tech:{
     save_path:"/Drawings"
     load_path:"/Drawings"
  }
}
```

FIG. 27

| SCHEDULE ID | SCHEDULE NAME | SCHEDULE TYPE | SCHEDULE OWNER | START TIME AND PERIOD | INVITEE |
|---|---|---|---|---|---|
| sch-1 | Abc Launch Plan | Meeting | office5 | NOVEMBER 10, 2018 12:00-13:00 | office1 (Mary), office2 (Sato), office5 (Suzuki) |
| sch-2 | Abc Project | Meeting | office1 | NOVEMBER 10, 2018 15:00-15:30 | office1 (Mary), office3 (Saito), office4 (Itoh), |
| sch-3 | Abc Investigation | Meeting | office1 | NOVEMBER 12, 2018 15:00-15:30 | office1 (Mary), office3 (Saito), office4 (Itoh), office6 (Kondoh) |

FIG. 28

| DEVICE ID | DATE AND TIME | EVENT |
|---|---|---|
| K100029 | NOVEMBER 10, 2018 12:01 | Start meeting |
| | NOVEMBER 10, 2018 12:01 | Add user user001 |
| | NOVEMBER 10, 2018 12:02 | Schedule Set Abc Launch Plan |
| | NOVEMBER 10, 2018 12:02 | Schedule Owner is user005 |
| | NOVEMBER 10, 2018 12:02 | Add user user002 |
| | NOVEMBER 10, 2018 12:02 | Add user user005 |
| | NOVEMBER 10, 2018 12:05 | Search by Abc |
| | NOVEMBER 10, 2018 12:05 | Select site Abc Tech |
| | NOVEMBER 10, 2018 12:49 | Save to/Drawings |
| | NOVEMBER 10, 2018 12:50 | End meeting |
| | NOVEMBER 10, 2018 15:01 | Start meeting |
| | NOVEMBER 10, 2018 15:01 | Add user user001 |
| | NOVEMBER 10, 2018 15:02 | Schedule Set Abc Project |
| | NOVEMBER 10, 2018 15:02 | Schedule Owner is user001 |
| | NOVEMBER 10, 2018 15:02 | Add user user003 |
| | NOVEMBER 10, 2018 15:02 | Add user user004 |
| | NOVEMBER 10, 2018 15:05 | Search by Abc |
| | NOVEMBER 10, 2018 15:05 | Select site Abc Project |
| | NOVEMBER 10, 2018 15:54 | Save to/Materials/Temp |
| | NOVEMBER 10, 2018 15:55 | End meeting |
| K100055 | ... | ... |
| ... | ... | ... |

FIG. 29

| SHARED SITE NAME | KEYWORD | DEVICE OWNER | LATEST USAGE DATE AND TIME | NUMBER OF USAGES |
|---|---|---|---|---|
| Abc Project | abc | user001 | NOVEMBER 10, 2018 15:55 | 1 |
|  | ... | ... | ... | ... |
| Abc Tech | abc | user001 | NOVEMBER 10, 2018 12:50 | 1 |
|  | ... | .. | ... | .. |

FIG. 30

```
{
  primary:"Abc Project",
  site_name:[
  "Abc Project",
  "Abc Tech"
  ]
}
```

INFORMATION PROCESSING APPARATUS, INFORMATION PROCESSING SYSTEM, AND INFORMATION PROCESSING METHOD

CROSS-REFERENCE TO RELATED APPLICATIONS

This patent application is based on and claims priority pursuant to 35 U.S.C. § 119(a) to Japanese Patent Applications No. 2019-117789, filed on Jun. 25, 2019, No. 2019-188145 filed on Oct. 11, 2019, and No. 2020-080819 filed on Apr. 30, 2020 in the Japan Patent Office, the entire disclosure of which is hereby incorporated by reference herein.

BACKGROUND

Technical Field

The present disclosure relates to an information processing apparatus, an information processing system, and an information processing method.

Background Art

Conventionally, there has been a server for assisting users in efficiently sharing information created by a collaborative work such as a meeting among interested parties. The server that assists collaborative work extracts candidates for collaborative work space to store the result data of the collaborative work notified, using the detected information, from collaborative work space that stores data shared by the users of multiple parties in collaborative work.

With the spread use of cloud computing in recent years, a shared site such as SharePoint (registered trademark) that is shared by a plurality of users to improve efficiency of group work became available. Further, by distributing a uniform resource locator (URL) of a file stored at the shared site to a plurality of users by email, the plurality of users can easily view the file later. Since a shared site is created specific to a particular purpose, files created for the same purpose can easily be shared by multiple users by saving the files on the same shared site.

SUMMARY

Embodiments of the present disclosure describe an information processing apparatus, an information processing system, and an information processing method. The information processing apparatus detects a user, acquires schedule information of the user based on the detected user, and suggests one or more shared sites to use according to the schedule information.

BRIEF DESCRIPTION OF THE DRAWINGS

A more complete appreciation of the embodiments and many of the attendant advantages and features thereof can be readily obtained and understood from the following detailed description with reference to the accompanying drawings, wherein:

FIG. 4 is a block diagram illustrating an example of a functional configuration of the information processing system according to embodiments of the present disclosure;

FIG. 5 is a diagram illustrating an example of account information;

FIG. 6 is a diagram illustrating an example of schedule information;

FIG. 7 is a diagram illustrating an example of user information;

FIG. 8 is a diagram illustrating an example of external service settings information;

FIG. 9 is a diagram illustrating an example of participant management information;

FIG. 10 is a diagram illustrating an example of electronic whiteboard usage information;

FIG. 11 is a diagram illustrating an example of shared site information;

FIG. 12 is a diagram illustrating an example of a suggested shared site list returned by the shared site information management unit;

FIG. 27 is a diagram illustrating schedule information;

FIG. 28 is a diagram illustrating another example of electronic whiteboard usage information;

FIG. 29 is a diagram illustrating an example of shared site information;

FIG. 30 is a diagram illustrating a suggested shared site list returned by the shared site information management unit;

Figure 1:
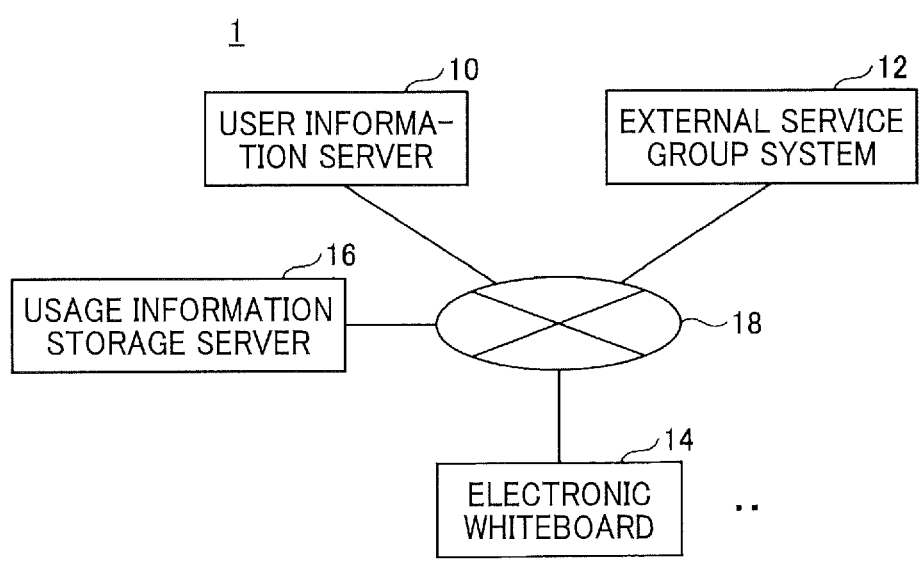
FIG. 1 is a schematic diagram illustrating an example of an information processing system according to embodiments of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result. As used herein, the singular forms "a", "an", and "the" are intended to include the plural forms as well, unless the context clearly indicates otherwise.

Hereinafter, a description is given of several embodiments of the present disclosure with reference to the drawings. In the present embodiment, an example of a meeting using an electronic whiteboard is described, but the present disclosure is not limited to the meeting and applies to various situations such as seminars and lectures.

FIG. 1 is a schematic diagram illustrating a configuration of an information processing system according to the present embodiment. The information processing system 1 illustrated in FIG. 1 includes a user information server 10, an external service group system 12, an electronic whiteboard 14, and a usage information storage server 16 communicably connected with each other through a network 18 such as the internet or a local area network (LAN).

The user information server 10, the electronic whiteboard 14, and the usage information storage server 16 implement an electronic whiteboard system. The electronic whiteboard system provides functions related to the electronic whiteboard 14 by operating in cooperation with the external service group system 12 outside the electronic whiteboard system.

The external service group provided by the external service group system 12 indicates an integrated service such as Office 365 (registered trademark) including a user service, a shared site service, a storage service, an email service, a schedule service (calendar service), and the like.

The external service group is provided so that services such as the user service, the shared site service, the storage service, the email service, and the schedule service are used with the same user account. The external service group provided by the external service group system 12 is also called groupware, and each service belonging to the same external service group is used with the same authentication information (combination of identifier (ID) and password, access token, etc.). The external service groups may be different for each user and may be one or more. The external service group is referred to as the "external service" in the embodiments of the present disclosure. However, the external service group does not have to be operated by a different entity (company or the like) from the electronic whiteboard 14, the usage information storage server 16, and the user information server 10, and does not have to be an external service as long as the external service group includes the user service and the shared site service. The external service group system 12 is implemented by one or more computers.

The user information server 10 stores a user information list, external service settings information, and the like, which is described below, and is used by the external service group system 12 or the electronic whiteboard 14. The user information server may be shared by a plurality of electronic whiteboards 14 and may not be on the same network segment. Further, the user information server 10 may be included in the electronic whiteboard 14. The user information server 10 is implemented by one or more computers.

The electronic whiteboard 14 is used in a meeting in which a plurality of users participate. The electronic whiteboard 14 displays an image drawn by, for example, an electronic pen or a hand. The electronic whiteboard 14 also displays an image of an electronic file read from a universal serial bus (USB) memory, a personal computer (PC) connected through a cable, or the external service group system 12, or the like. Further, the electronic whiteboard 14 displays an image captured by a camera.

The electronic whiteboard 14 is an example and may be any device as long as the device is shared by a plurality of users, such as a meeting system terminal, a display, and a projector. The electronic whiteboard 14 is an example of an information processing apparatus shared and used by a plurality of users. The usage information storage server 16 stores electronic whiteboard usage information, shared site information, etc., which is described below, and is used by the electronic whiteboard 14.

The configuration of the information processing system 1 illustrated in FIG. 1 is an example. For example, at least a part of the functions of the user information server 10, the external service group system 12, or the usage information storage server 16 may be provided in the electronic whiteboard 14. The information processing system 1 may implement at least a part of the functions of the user information server 10, the external service group system 12, the electronic whiteboard 14, or the usage information storage server 16, by an information processing apparatus other than the user information server 10, the external service group system 12, the electronic whiteboard 14, and the usage information storage server 16.

Figure 2:
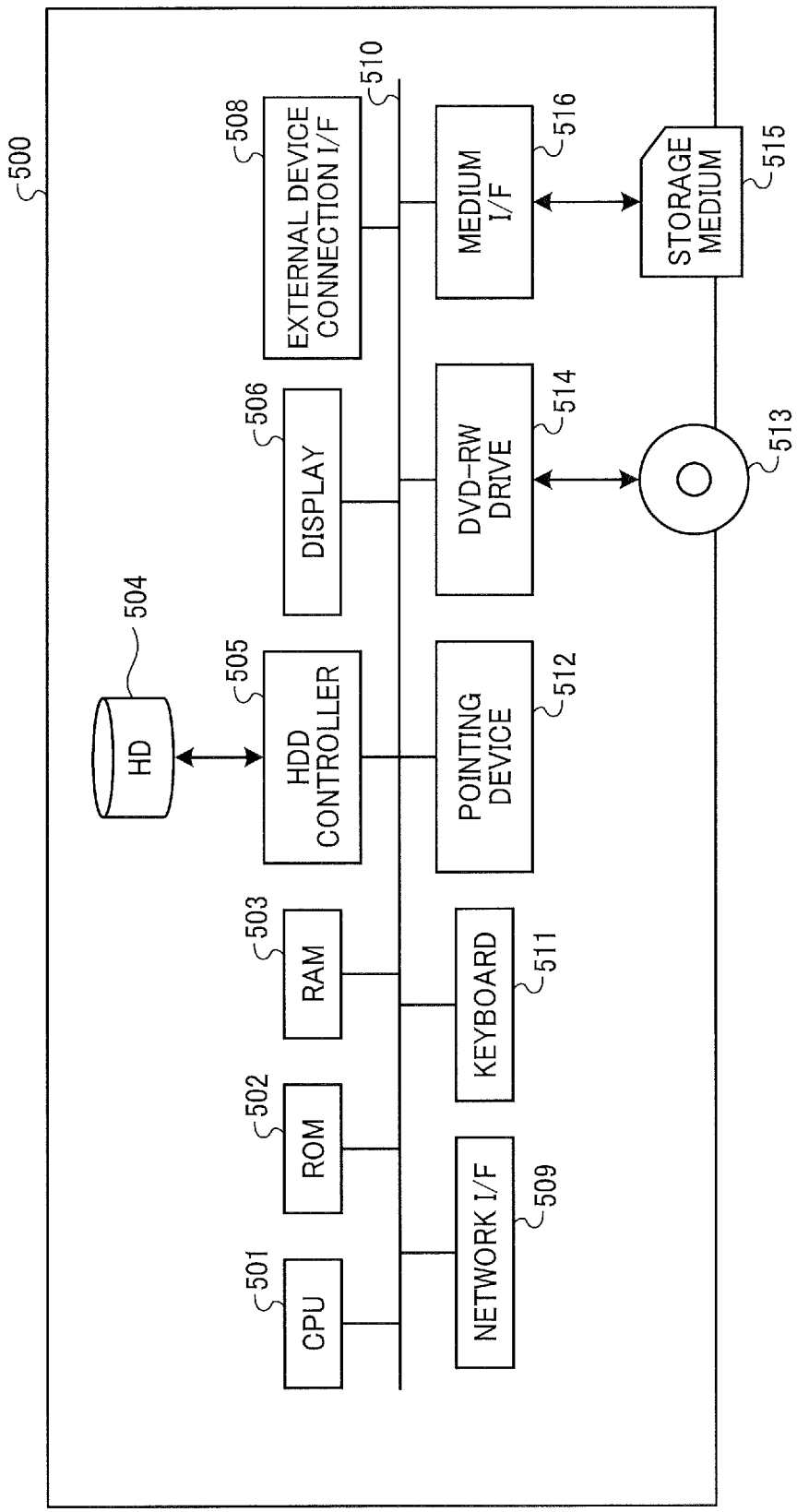
FIG. 2 is a block diagram illustrating an example of a hardware configuration of a computer, according to embodiments of the present disclosure.

The user information server 10, the external service group system 12, and the usage information storage server 16 illustrated in FIG. 1 are implemented by a computer 500 having a hardware configuration as illustrated in FIG. 2, for example. FIG. 2 is a block diagram illustrating an example of a hardware configuration of a computer according to the present embodiment.

As illustrated in FIG. 2, the computer 500 includes a central processing unit (CPU) 501, a read only memory (ROM) 502, a random access memory (RAM) 503, a hard disk (HD) 504, a hard disk drive (HDD) controller 505, a display 506, an external device connection interface (I/F) 508, a network I/F 509, a data bus 510, a keyboard 511, a pointing device 512, a digital versatile disk rewritable (DVD-RW) drive 514, and a medium I/F 516.

Among these elements, the CPU 501 controls entire operation of the computer 500 according to a program. The ROM 502 stores a program such as an initial program loader (IPL) used for driving the CPU 501. The RAM 503 is used as a work area for the CPU 501. The HD 504 stores various data such as a control program. The HDD controller 505 controls reading and writing of various data from and to the HD 504 under control of the CPU 501.

The display 506 displays various information such as a cursor, menu, window, character, or image. The external device connection I/F 508 is an interface for connecting various external devices. The external device in this case is, for example, a USB memory or a printer. The network I/F 509 is an interface for performing data communication using the network 18. The data bus 510 is an address bus, a data bus, or the like for electrically connecting each element such as the CPU 501.

The keyboard 511 is one example of an input device provided with a plurality of keys for allowing a user to input characters, numerals, or various instructions. The pointing device 512 is an example of an input device that allows a user to select or execute a specific instruction, select a target for processing, or move a cursor being displayed. The DVD-RW drive 514 reads and writes various data from and to a DVD-RW 513, which is an example of a removable storage medium. The removable storage medium is not limited to the DVD-RW and may be a digital versatile disc-recordable (DVD-R) or the like. The medium I/F 516 controls reading and writing (storing) of data from and to the storage medium 515 such as a flash memory.

Figure 3:
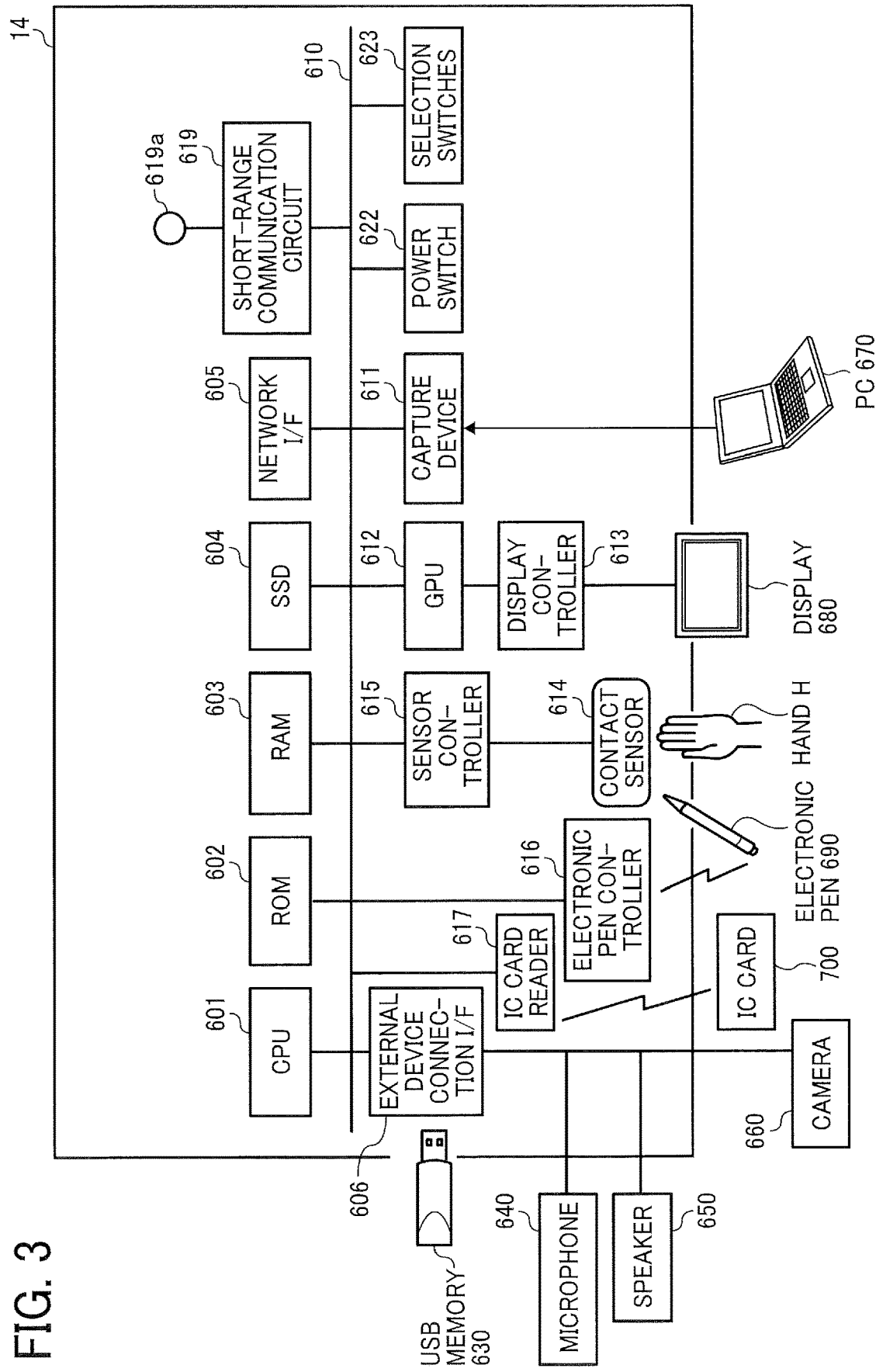
FIG. 3 is a block diagram illustrating an example of a hardware configuration of an electronic whiteboard, according to embodiments of the present disclosure.

FIG. 3 is a block diagram illustrating a hardware configuration of an electronic whiteboard according to the present embodiment. As illustrated in FIG. 3, the electronic whiteboard 14 includes a CPU 601, a ROM 602, a RAM 603, a solid state drive (SSD) 604, a network I/F 605, and an external device connection I/F 606.

Among these elements, the CPU 601 controls entire operation of the electronic whiteboard 14 according to the program. The ROM 602 stores programs used for driving the CPU 601 such as an initial program loader (IPL). The RAM 603 is used as a work area for the CPU 601. The SSD 604 stores various data such as a program for the electronic whiteboard 14.

The network I/F 605 controls communication with the network 18. The external device connection I/F 606 is an interface for connecting various external devices. The external devices in this case are, for example, the universal serial bus (USB) memory 630 and external devices (a microphone 640, a speaker 650, and a camera 660).

Further, the electronic whiteboard 14 includes a capture device 611, a graphics processing unit (GPU) 612, a display controller 613, a contact sensor 614, a sensor controller 615, an electronic pen controller 616, an integrated circuit (IC) card reader 617, a short-range communication circuit 619, an antenna 619a for the short-range communication circuit 619, a power switch 622 and selection switches 623.

The capture device 611 causes the display of the external PC 670 to display video data as a still image or a moving image. The GPU 612 is a semiconductor chip dedicated to processing a graphical image. The display controller 613 controls and manages screen display so as to output an image from the GPU 612 to a display 680 or the like.

The contact sensor 614 detects contact with the display 680 by an electronic pen (stylus pen) 690 or a user's hand H. The sensor controller 615 controls processing of the contact sensor 614. The contact sensor 614 performs input of coordinates and detection of coordinates by an infrared cutoff method. The light-receiving elements emit a plurality of infrared rays parallel to a surface of the display 680. The light-receiving elements receive light passing in the direction that is the same as an optical path of the emitted infrared rays, which are reflected by the reflector frame. More specifically, the display 680 is provided with two light-receiving elements disposed on both upper side ends of the display 680, and a reflector frame surrounding the sides of the display 680.

The contact sensor 614 outputs an identifier (ID) of the infrared ray that is blocked by an object (such as the user's hand) after being emitted from the light-receiving elements, to the sensor controller 615. Based on the ID of the infrared ray, the sensor controller 615 detects a specific coordinate that is touched by the object. The electronic pen controller 616 communicates with the electronic pen 690 to detect contact by the tip or bottom of the electronic pen 690 with the display 680.

The IC card reader 617 reads identification information unique to the IC card 700 from a radio frequency (RF) tag embedded in the IC card 700 by wireless communication. The IC card reader 617 may be included in the electronic whiteboard 14 or may be external to the electronic whiteboard 14. Note that the IC card 700 may be included in a smart device such as a smartphone. The electronic whiteboard 14 may use a device other than the IC card reader 617 as long as the device can acquire identification information capable of identifying the user, and may use a biometric authentication device (fingerprint, palm print, iris, face, etc.) or a barcode reading device, and the like.

The short-range communication circuit 619 is a communication circuit such as near field communication (NFC) or Bluetooth (registered trademark). The power switch 622 controls power to the electronic whiteboard 14. The selection switches 623 are a group of switches for adjusting brightness, hue, etc., of display on the display 680, for example.

The electronic whiteboard 14 further includes a bus line 610. The bus line 610 is an address bus, a data bus, or the like for electrically connecting each component such as the CPU 601 illustrated in FIG. 3.

The contact sensor 614 is not limited to the infrared blocking system type described above and may be a different type of detector, such as a capacitance touch panel that identifies the contact position by detecting a change in capacitance, a resistance film touch panel that identifies the contact position by detecting a change in voltage of two opposed resistance films, or an electromagnetic induction touch panel that identifies the contact position by detecting electromagnetic induction caused by contact of an object against the display. In addition to or as an alternative to detecting contact by the tip or bottom of the electronic pen 690, the electronic pen controller 616 may also detect contact by another part of the electronic pen 690, such as a part held by a hand of the user.

The information processing system 1 according to the present embodiment is implemented, for example, by a functional configuration illustrated in FIG. 4. FIG. 4 is a block diagram illustrating the functional configuration of the information processing system according to the present embodiment. The functional configuration in FIG. 4 omits components unnecessary for the description of the present embodiment as appropriate.

The information processing system 1 illustrated in FIG. 4 includes a user information server 10, an external service group system 12, an electronic whiteboard 14, and a usage information storage server 16. FIG. 4 illustrates an external service group system "office.example.com" as an example of the external service group system 12.

The external service group system 12 exemplifies a user service 30, a shared site service 32, a schedule service 34, and an email service 36 as external service groups provided to the user. The user service 30 of the external service group system 12 stores, for example, account information as illustrated in FIG. 5. FIG. 5 is a diagram illustrating an example of the account information. As illustrated in FIG. 5, the user service 30 of the external service group system 12 stores a user ID, a name, and an email address as the account information.

The shared site service 32 provides a site (shared site) shared by a plurality of users. The shared site allows users to read and save files. A shared site is created for each purpose. A plurality of users who work for the same purpose (a plurality of users who work in groups) reads and saves files in the same shared site.

The schedule service 34 stores, for example, schedule information as illustrated in FIG. 6. FIG. 6 is a diagram illustrating an example of the schedule information. The schedule service 34 manages the user's action schedule and meeting schedule based on the schedule information of FIG. 6.

As illustrated in FIG. 6, the schedule service 34 stores schedule ID, schedule name, schedule type, schedule owner, start time and period, and invitee as the schedule information. The schedule ID is an example of schedule identification information. The schedule name is a name of a schedule. The schedule type is an example of information for distinguishing a schedule between a user's action schedule and a user's meeting schedule. The schedule owner is an example of information for identifying a user who owns the schedule information.

The start time and period are an example of information indicating the date and time when the schedule starts and the period from the start to the end of the schedule. The invitee is a user who is scheduled to participate in the schedule. The term schedule used in description of the present embodiment is an example, and may be replaced by terms such as meeting, reservation, or calendar.

The email service 36 stores an email address for each user in the external service group system 12 and provides an email function to the user. The email service 36 stores emails addressed to the user's email address in the external service group system 12.

The user information server 10 includes an external service settings information unit 20 and a user information unit 22. The user information unit 22 stores, for example, a user information list illustrated in FIG. 7. FIG. 7 is a diagram illustrating an example of the user information list. As illustrated in FIG. 7, the user information list stores a user ID, a name, an email address, an external service setting ID, and identification information.

The email address is different from the email address in FIG. 5, and for example, the email address used in an intranet. The external service setting ID is information for identifying external service settings information described below. The identification information is, for example, identification information unique to the IC card 700. According to the user information list illustrated in FIG. 7, the user ID and the external service settings information is identified from the identification information read from the user's IC card 700.

The external service settings information unit 20 stores, for example, external service settings information as illustrated in FIG. 8. FIG. 8 is a diagram illustrating an example of the external service settings information. The external service settings information illustrated in FIG. 8 is settings information that differs for each user for using the external service group system 12. The external service settings information stores an external service setting ID, the user ID, address information, an external service user ID, and an external service authentication token.

The address information and the external service user ID are examples of connection information to the external service group system 12. The external service authentication token is an example of authentication information of the external service group system 12.

The electronic whiteboard 14 includes a meeting schedule setting unit 40, a shared site management unit 42, a participant management unit 44, a writing display unit 46, and an IC card detection unit 48. The IC card detection unit 48 reads the identification information from the detected IC card 700 of the user. The participant management unit 44 manages participants of a meeting in a participant management information list as illustrated in FIG. 9, for example.

FIG. 9 is a diagram illustrating an example of participant management information. The participant management information list includes the user ID of a user recognized as a participant of the meeting, information indicating whether the participant is an organizer, external service settings information, and the email address. For example, the participant management unit 44 identifies the user information from the user information list of FIG. 7 using the identification information read by the IC card detection unit 48 and stores the user ID of the identified user information as the user ID of the participant in the participant management information list.

The participant management information list in FIG. 9 illustrates an example in which the participant with the user ID "user001" is the organizer among the participants with the user IDs "user001", "user002", and "user005". The participant management unit 44 transmits notification to the usage information management unit 52 of the usage information storage server 16. Specifically, the participant management unit 44 notifies the time when the meeting is started and the user ID of the organizer at the timing when the participant (organizer) is first added when the use of the electronic whiteboard 14 is started. After that, the participant management unit 44 notifies the user ID of the participant every time the participant is added during the meeting. The participant management unit 44 also notifies the end time of the meeting when the use of the electronic whiteboard 14 is finished. A device ID of the electronic whiteboard 14 is included in each notification.

The writing display unit 46 accepts the user's writing on the electronic whiteboard 14 and displays the contents of the writing. The shared site management unit 42 displays a shared site selection screen described below. On the shared site selection screen, shared sites are searched, and a shared site is selected from the search result. When the shared site is selected, the shared site management unit 42 notifies the usage information management unit 52 of the usage information storage server 16 of the name of the selected shared site and the device ID of the electronic whiteboard 14. Further, the shared site management unit 42 displays a shared site save screen described below. The shared site save screen saves the contents written in the electronic whiteboard 14 as a file to the shared site and transmits a uniform resource locator (URL) of the saved file by an email. The email is sent to the user recognized as the participant by the participant management unit 44.

The meeting schedule setting unit 40 has a user interface for setting a meeting schedule and communicates with the schedule service 34 to acquire the schedule information illustrated in FIG. 6. In addition, the meeting schedule setting unit 40 selects a meeting schedule from a plurality of user's schedule information and suggests the selected meeting schedule by displaying the schedule on the schedule suggestion screen described below.

The schedule suggestion screen displays the schedule name of the meeting, the schedule owner, the participants, and the suggested shared site name. The suggested shared site name is displayed according to the suggested shared site list obtained as a result of transmitting the schedule name, schedule owner, and participants of the meeting to the shared site information management unit 50 of the usage information storage server 16, as described below. When the schedule is set, the meeting schedule setting unit 40 notifies the usage information management unit 52 of the usage information storage server 16 of the device ID of the electronic whiteboard 14, the schedule name, and the schedule owner.

The usage information storage server 16 includes a shared site information management unit 50, a usage information management unit 52, a shared site information storage unit 54, and an electronic whiteboard usage information storage unit 56. The usage information management unit 52 stores, for example, the electronic whiteboard usage information illustrated in FIG. 10 in the electronic whiteboard usage information storage unit 56. FIG. 10 is a diagram illustrating an example of the electronic whiteboard usage information. As illustrated in FIG. 10, the electronic whiteboard usage information stores a device ID, date and time, and event. When the usage information management unit 52 receives the notification from the meeting schedule setting unit 40, the shared site management unit 42, and the participant management unit 44, the usage information management unit 52 adds the notification information to the electronic whiteboard usage information in FIG. 10.

FIG. 10 illustrates an example of the electronic whiteboard usage information up to "Nov. 10, 2018 15:55" of the electronic whiteboard 14 having the device ID "K100029". In FIG. 10, the event "Start meeting" indicates a meeting start event. The event "End meeting" indicates a meeting end event.

The event "Add user user ID" indicates that the user with the user ID started using the electronic whiteboard 14. The event "Schedule Set Schedule Name" indicates an event for setting a meeting schedule. The event "Select site shared site name" indicates a shared site selection event. The event "Load from/path name" indicates that data is loaded from the shared site. The event "Save to/path name" indicates that data is saved to the shared site. The event "Schedule Owner is user ID" indicates a schedule owner notification event.

For example, in FIG. 10, Mary having the user ID "user001" held the IC card 700 over the IC card reader 617 at "12:01" and started using the electronic whiteboard 14 having the device ID "K100029". Further, the schedule having the schedule ID "sch-1" is set at "12:02". At the same time, Sato having the user ID "user002" and Suzuki having the user ID "user005" each held the IC card 700 of his or her own over the IC card reader 617 and started using the electronic whiteboard 14 having the device ID "K100029". The shared site with the shared site name "Abe Tech" is selected at "12:05".

Further, in FIG. 10, Mary having the user ID "user001" held the IC card 700 over the IC card reader 617 at "15:01" and started using the electronic whiteboard 14 having the device ID "K100029". In addition, the schedule having the schedule ID "sch-2" is set at "15:02". At the same time, Saito having the user ID "user003" and Itoh having the user ID "user004" each held the IC card 700 of his or her own over the IC card reader 617 and started using the electronic whiteboard 14 having the device ID "K100029". Also, the shared site with the shared site name "Abc Project" is selected at "15:05".

The shared site information management unit 50 stores, for example, the shared site information illustrated in FIG. 11 in the shared site information storage unit 54. FIG. 11 is a diagram illustrating an example of the shared site information. The shared site information is created based on the electronic whiteboard usage information illustrated in FIG. 10. As illustrated in FIG. 11, the shared site information stores the shared site name, the schedule name, the schedule owner, the participant, a last use date and time, the number of times, a load path, and a save path.

The shared site name is a name of the shared site. The schedule name is a schedule name of a meeting (schedule) using the shared site. The schedule owner is the owner of the meeting using the shared site. Participants are participants of the meeting using the shared site with the same schedule name and schedule owner. The last use date and time is the end time of the meeting using the shared site with the same schedule name and schedule owner. The number of times is the number of times a meeting using the shared site is held with the same schedule name and schedule owner.

The load path is the path last used for loading data from the shared site with the same schedule name and schedule owner. The save path is the path last used for saving data to the shared site with the same schedule name and schedule owner. The load path and the save path become the default load path and save path of the meeting using the shared site with the same schedule name and schedule owner. In the present embodiment, the path that was last used for loading or saving of the data is used. Alternatively, a plurality of paths may be saved and used as a path list.

For example, in the electronic whiteboard usage information until "16:00 on Nov. 10, 2018" in FIG. 11, the schedule name "Launch Plan", the participants "user001", "user003", and "user004", and the schedule owner "user001" are stored for the meeting that selected the shared site name "Abe Project".

By using these pieces of information, the shared site name "Abc Project", the schedule name "Launch Plan", the schedule owner "user001", the participants "user001", "user003", and "user004", the last use date and time "Nov. 10, 2018 15:55", the number of usages "1", the load path "/Materials/Draft" and the save path "/Materials/Temp" are stored in association with each other in the shared site information illustrated in FIG. 11. In the shared site information of FIG. 11, a schedule with a different schedule name or a different schedule owner is stored in a different row.

In addition, when a meeting using the shared site is held a plurality of times with the same schedule name and schedule owner, the user ID is added to the item "participant" of the shared site information in FIG. 11 without duplication.

The shared site information management unit 50 acquires the electronic whiteboard usage information from the usage information management unit 52 at any timing (for example, once an hour), identifies the schedule name, schedule owner, and the participants of the meeting in which the shared site is selected, and updates the shared site information illustrated in FIG. 11. Here, an example in which the "participant" is added to the shared site information of FIG. 11 based on the electronic whiteboard usage information of FIG. 10 is described. Alternatively, the "participant" in the shared site information may be updated with the external service user ID of the user using each shared site acquired from the shared site service 32 and converted using the external service settings information of FIG. 8.

Further, the shared site information management unit 50 returns to the meeting schedule setting unit 40 a suggested shared site list as illustrated in FIG. 12 based on the schedule name, schedule owner, and participants transmitted from the meeting schedule setting unit 40 of the electronic whiteboard 14.

FIG. 12 is a diagram illustrating the suggested shared site list returned by the shared site information management unit 50. FIG. 12 illustrates an example of a suggested shared site list, when a schedule name "Launch Plan", a schedule owner "user001", and participants "user001" "user003" "user004" "user006" are transmitted from the shared site information in FIG. 11.

"Primary" in FIG. 12 indicates the most recommended shared site name "Abc Project". "Site_name" indicates a list of suggested shared sites "Abe Project" and "Abe Tech".

Note that here, "primary" is a shared site in which the schedule name and schedule owner are the same, and the latest use date and time is associated with the latest electronic whiteboard usage information. As a result, the shared site used in the most recent meeting among the meetings convened by the same user becomes "primary". Instead of the shared site used in the most recent meeting, the shared site used in the most frequent meetings may be set as "primary". If there is no shared site with the same schedule name and schedule owner, a shared site with the same schedule name may be indicated as "primary", if only one shared site is identified as having the same schedule name.

Further, "site_name" is a shared site in which the schedule names are the same and the participants are duplicated. As a result, the shared site used by another user with the same schedule name is excluded. Further, "save_path" indicates a default save path when each shared site is selected. Also, "load_path" indicates a default load path when each shared site is selected.

In the above description, an example of comparing the schedule owner set in the current meeting schedule setting unit 40 with the schedule owners of past meetings when creating the suggested shared site list is described. Instead of the schedule owner set in the meeting schedule setting unit 40, the organizer (the user who first performed the login operation at the beginning of the meeting) may be compared with the schedule owner of past meetings.

In the present embodiment, the shared site information management unit 50 acquires the schedule name, schedule owner, and participants and determines the suggested shared site list. Alternatively, the usage information management unit 52 may acquire the shared site information and may determine the suggested shared site list.

The configuration illustrated in FIG. 4 is an example, and other configurations may be used. For example, each unit of the electronic whiteboard 14 may be implemented by two devices, and each component other than the IC card detection unit 48 and the writing display unit 46 of the electronic whiteboard 14 may be implemented by a server. In addition, the user information server 10 or the usage information storage server 16 may include each unit other than the IC card detection unit 48 and the writing display unit 46 of the electronic whiteboard 14 without changing the device configuration, or the user information unit 22 of the user information server 10 and the external service settings information unit 20 may be provided in different devices. Further, the shared site information management unit 50, the usage information management unit 52, the shared site information storage unit 54, and the electronic whiteboard usage information storage unit 56 of the usage information storage server 16 may be implemented by different devices without changing the device configuration.

Figure 13:
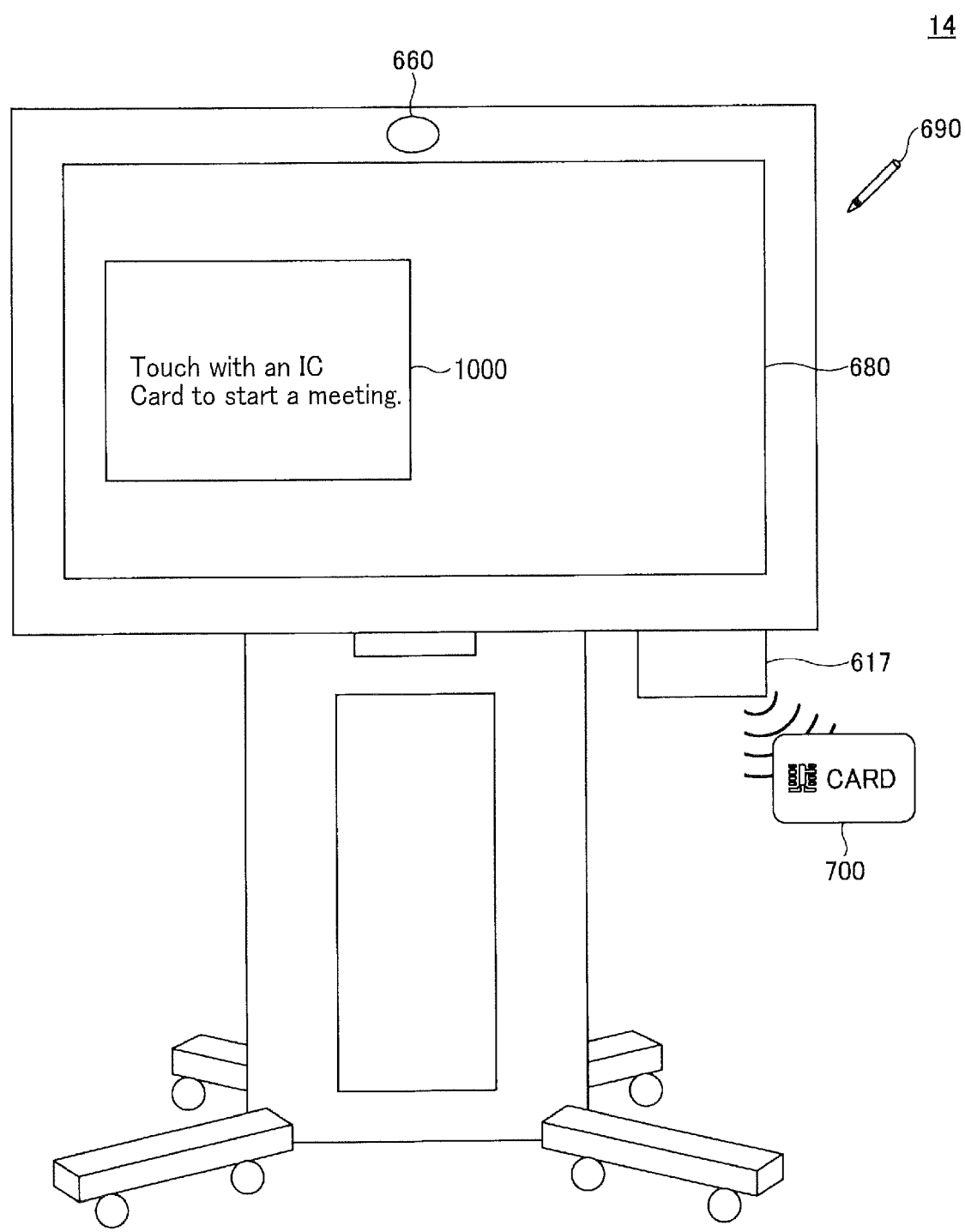
FIG. 13 is a diagram illustrating an external view of the electronic whiteboard according to embodiments of the present disclosure.

FIG. 13 is a diagram illustrating an external view of the electronic whiteboard according to embodiments of the present disclosure. As illustrated in FIG. 13, the electronic whiteboard 14 includes the display 680, the camera 660, and the IC card reader 617. The display 680 displays an operation panel 1000 described below. The electronic whiteboard 14 according to the present embodiment includes at least the following functions 1 to 5.

Function 1. Electronic Whiteboard Function: The electronic whiteboard 14 accepts writing on the display 680 with an electronic pen 690 or a finger. The electronic whiteboard 14 sends image data of writing on the display 680 by an email or stores image data in a storage provided by a storage service of the external service group system 12. The electronic whiteboard 14 also displays and edits a file such as meeting material.

Function 2. Authentication Function: The electronic whiteboard 14 acquires authentication information and the like using the IC card reader 617, the camera 660, the biometric authentication device and the like, and performs user authentication based on the authentication information and the like. The electronic whiteboard 14 may perform user authentication by itself or an external device may perform user authentication. The IC card reader 617 obtains authentication information such as identification information unique to the IC card 700 from the IC card 700 and authenticates the user by determining whether the authentication information matches by referring to the user information list in FIG. 7. The user may be authenticated by extracting a feature amount from a facial image captured by the camera 660 and determining whether the feature amount matches a feature amount registered in a user information list.

Function 3. External Service Cooperation Function: The electronic whiteboard 14 cooperates with the external service group system 12. For example, the electronic whiteboard 14 acquires the user's schedule information from the external service using the external service settings information of the user who has been authenticated by the authentication function and transmits information such as writing on the electronic whiteboard or a meeting material by an email to an invitee. Further, for example, the electronic whiteboard 14 accesses a storage area provided by a storage service of the external service group system 12 of the user who has been authenticated, acquires a file, shares the file with another device, or transfer the file to other devices.

Function 4. Remote Sharing Function: The electronic whiteboard 14 shares and collaboratively edits the screen (remote execution of electronic whiteboard function) displayed on the electronic whiteboard 14 and shares an image or a video of a participant in the remote meeting captured by the camera 660, a sound of the microphone 640, or the like with a plurality of information processing apparatuses (other electronic whiteboards 14, the PC, and the like) installed at remote locations. Sharing a screen refers to the use of multiple information processing apparatuses installed at remote locations to display (remote sharing) the same content on each information processing apparatuses and discuss the content in a remote meeting. Editing collaboratively refers to writing on the same screen from a plurality of information processing apparatuses, editing files, and the like.

Function 5. Other Functions: The electronic whiteboard 14 may include an application similar to an application operating on a general PC or a smart device, such as a web browser or an email application.

The functions described above are implemented by hardware and software of the electronic whiteboard 14 that operate in cooperation. The software includes a plurality of pieces of software installed on the electronic whiteboard 14 as well as those operating in cooperation with the external device.

Figure 14:
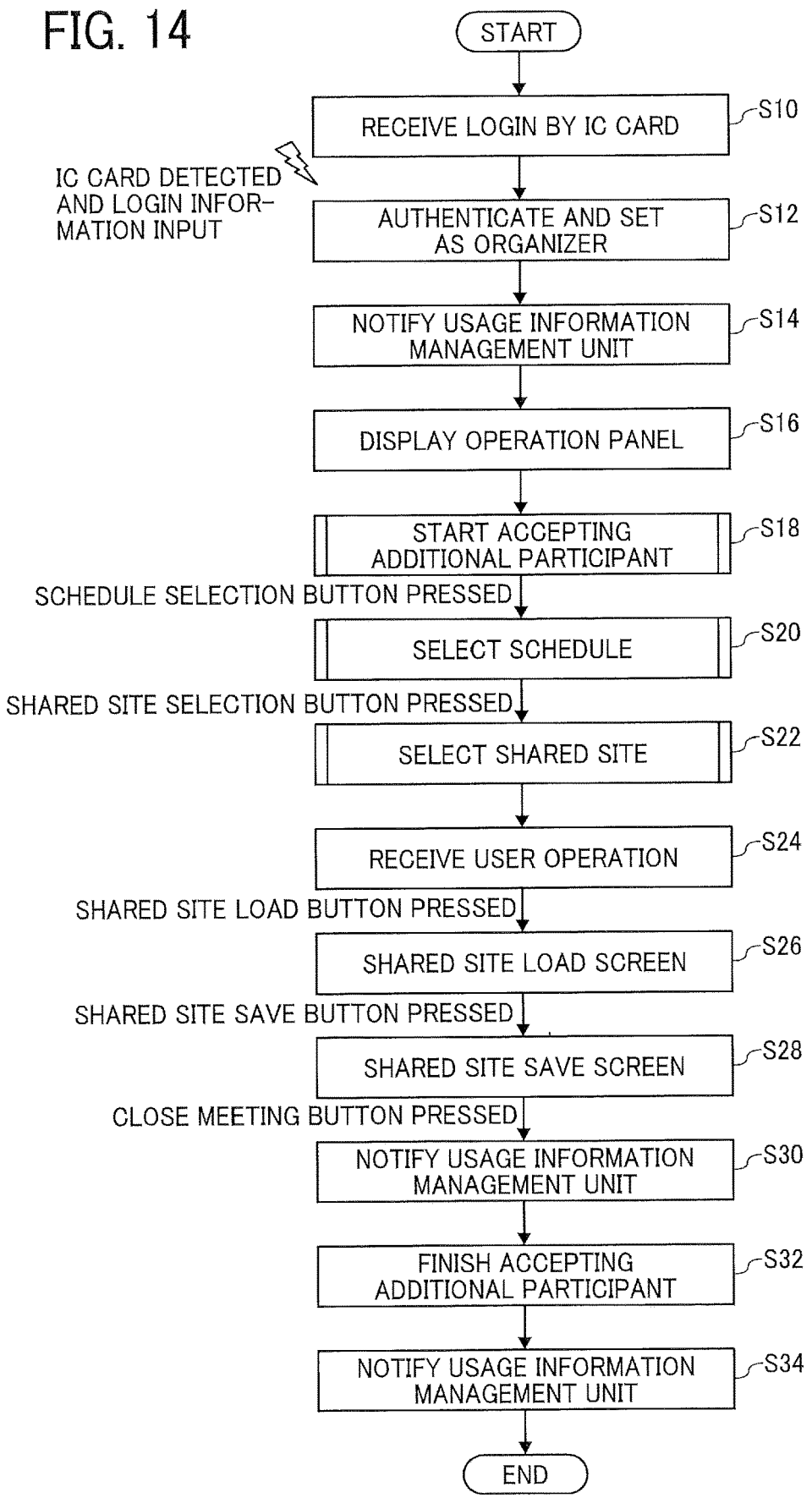
FIG. 14 is a flowchart illustrating a process of holding a meeting using the electronic whiteboard.

The information processing system 1 according to the present embodiment holds a meeting using the electronic whiteboard 14 in a process as illustrated in FIG. 14, for example. FIG. 14 is a flowchart illustrating the process of holding a meeting using the electronic whiteboard.

In step S10, when the electronic whiteboard 14 is activated, the electronic whiteboard 14 displays, for example, the operation panel 1000 illustrated in FIG. 13, and waits for login by the IC card 700. The organizer of the meeting holds his or her IC card 700 over the IC card detection unit 48.

When the IC card detection unit 48 detects the IC card 700, the electronic whiteboard 14 identifies user information from the identification information read from the IC card 700, authenticates, and sets the user as an organizer in step S12. In the present embodiment, the user who has performed authentication first is set as the organizer of the meeting. The authentication in step S12 may be ID/password authentication or face authentication. In this embodiment, the first authenticated user is designated as the organizer of the meeting. Alternatively, the selection of the organizer may be accepted through the screen displayed by the electronic whiteboard 14 at the time of user authentication, or the selection of the organizer may be accepted through the screen displayed by the electronic whiteboard 14 at any timing after the user authentication.

In step S14, the participant management unit 44 adds the authenticated user to the participant management information list as the organizer. In addition, the participant management unit 44 notifies the usage information management unit 52 of the usage information storage server 16 of the device ID, the time, the meeting start event, and the event of the use start event.

Figure 18:
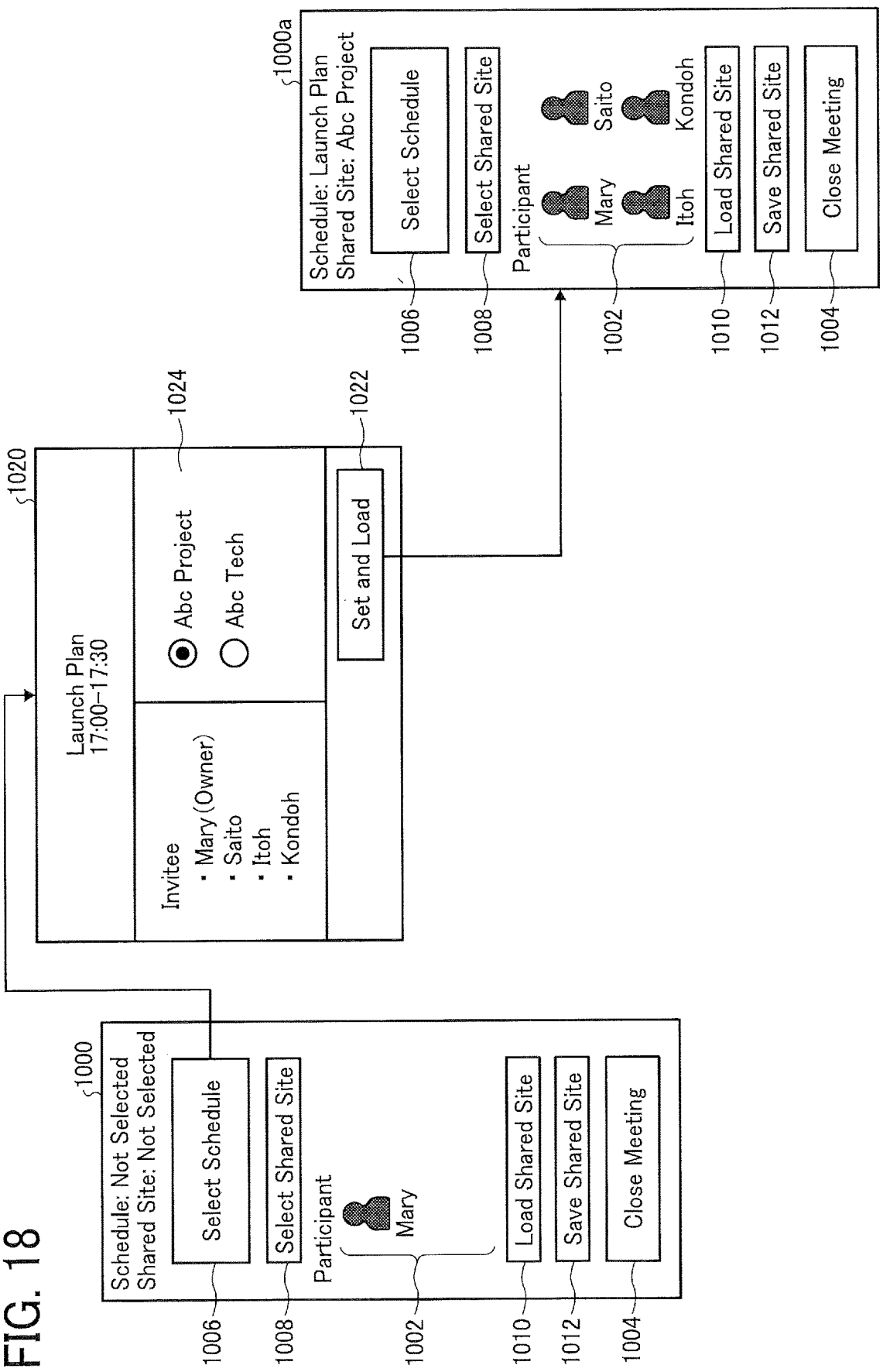
FIG. 18 is a diagram illustrating an example of a user interface (UI) displayed on the electronic whiteboard.

In step S16, the electronic whiteboard 14 displays, for example, an operation panel 1000 as illustrated in FIG. 18 as a UI. FIG. 18 is a diagram illustrating an example of a UI displayed on the electronic whiteboard. The operation panel 1000 in FIG. 18 displays a participant list 1002, a meeting close button 1004, a schedule selection button 1006, a shared site selection button 1008, a shared site load button 1010, and a shared site save button 1012. On the operation panel 1000 of FIG. 18 displayed in step S16, only "Mary" who is the organizer is displayed in the participant list 1002.

Figure 15:
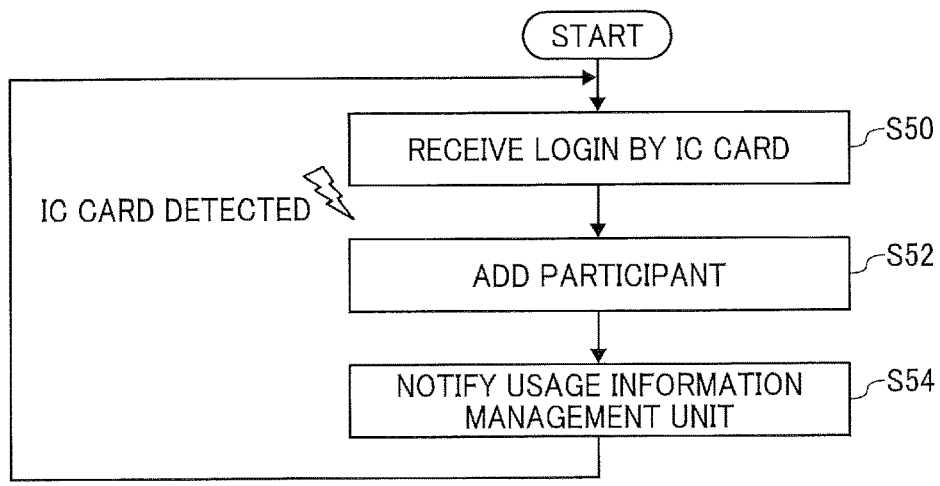
FIG. 15 is a flowchart illustrating a process for receiving additional participant.

In step S18, the electronic whiteboard 14 starts accepting additional participants. FIG. 15 is a flowchart illustrating a process for accepting the additional participants. In step S50, when the process of accepting additional participants is started, the electronic whiteboard 14 waits for a login by a user other than the organizer, performed by using the IC card 700 and the like.

A user other than the organizer holds his or her IC card 700 over the IC card detection unit 48. When detecting the IC card 700, the electronic whiteboard 14 identifies the user information from the identification information read from the IC card 700, authenticates, and sets the user as a meeting participant in step S52. The electronic whiteboard 14 adds the user who has been authenticated and set as the participant of the meeting to the participant list 1002. Further, the electronic whiteboard 14 notifies the usage information management unit 52 of the usage information storage server 16 and the device ID of the use start event by the added participant.

Figure 16:
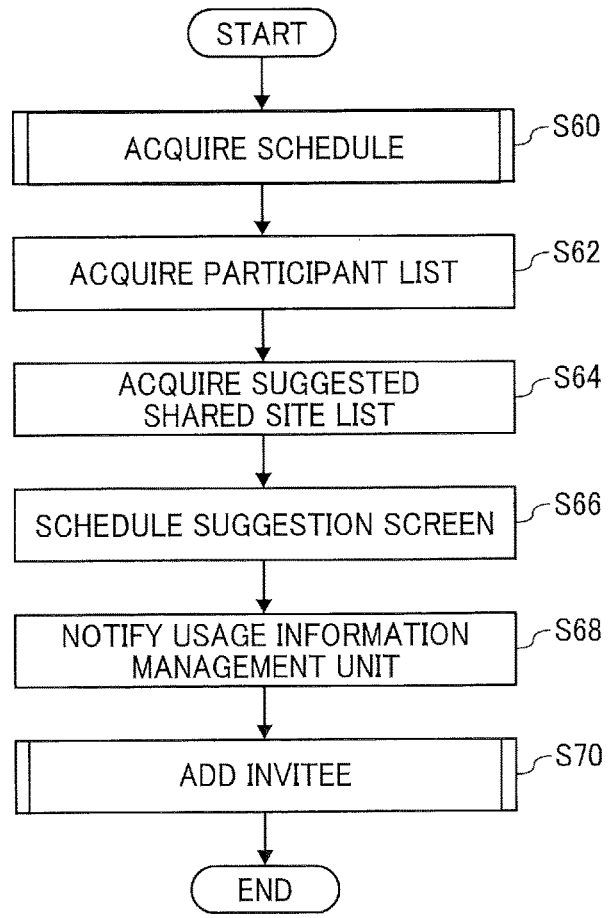
FIG. 16 is a flowchart illustrating a schedule selection process.

Returning to step S20 in FIG. 14, it is assumed that the electronic whiteboard 14 accepted the pressing of the schedule selection button 1006. In response to pressing of the schedule selection button 1006, the electronic whiteboard 14 starts selecting the schedule. FIG. 16 is a flowchart illustrating a schedule selection process.

In step S60, the electronic whiteboard 14 acquires the schedule information of the organizer from the schedule service 34. Note that the operation panel 1000 continues to be displayed even after the schedule selection button 1006 is pressed. In step S62, the electronic whiteboard 14 acquires the participant management information list of FIG. 9.

In step S64, the electronic whiteboard 14 transmits a schedule name and schedule owner in the schedule information of the organizer acquired in step S60 and a participant list in which invitee and participant in the participant management information list acquired in step S62 are combined without duplication, to the usage information storage server 16 and acquires a suggested shared site list.

In step S66, the electronic whiteboard 14 uses the schedule information and the suggested shared site list to display the schedule suggestion screen 1020 illustrated in FIG. 18. FIG. 18 is a diagram illustrating an example of a UI displayed on the electronic whiteboard. The schedule suggestion screen 1020 of FIG. 18 displays the schedule name, start time, end time, schedule owner, invitee, and suggested shared site 1024. The suggested shared site 1024 is displayed based on the acquired suggested shared site list.

The suggested shared site 1024 of FIG. 18 is displayed in a state where the shared site name set in "site_name" in the suggested shared site list can be selected, for example. Further, in the suggested shared site 1024 of FIG. 18, for example, when "primary" is set in the suggested shared site list, the most recommended shared site name is selected by default.

The display of the suggested shared site 1024 in FIG. 18 is an example, and the most recently used shared site may be displayed at the top based on the "latest usage date and time" of the shared site information in FIG. 11 or the most frequently used shared site may be displayed at the top based on the "number of usages" of the shared site information in FIG. 11.

The schedule suggestion screen 1020 may display the load path and the save path. By pressing the set and load button 1022 on the schedule suggestion screen 1020 of FIG. 18, the schedule displayed on the schedule suggestion screen 1020 and the shared site selected in the suggested shared site 1024 are set as the selected schedule and the shared site.

When the schedule and the shared site are set, the electronic whiteboard 14 notifies the usage information management unit 52 of the usage information storage server 16 of the set schedule and shared site as the schedule set event and the shared site selection event and the device ID in step S68.

In addition, in step S70, the electronic whiteboard 14 displays the set schedule and shared site on the operation panel 1000a as illustrated in FIG. 18 and adds the invitee of the schedule without duplication to the participant list 1002. In addition, the added participant is added to the participant management information list of FIG. 9 and notified to the usage information management unit 52 of the usage information storage server 16 by a use start event.

Figure 19:
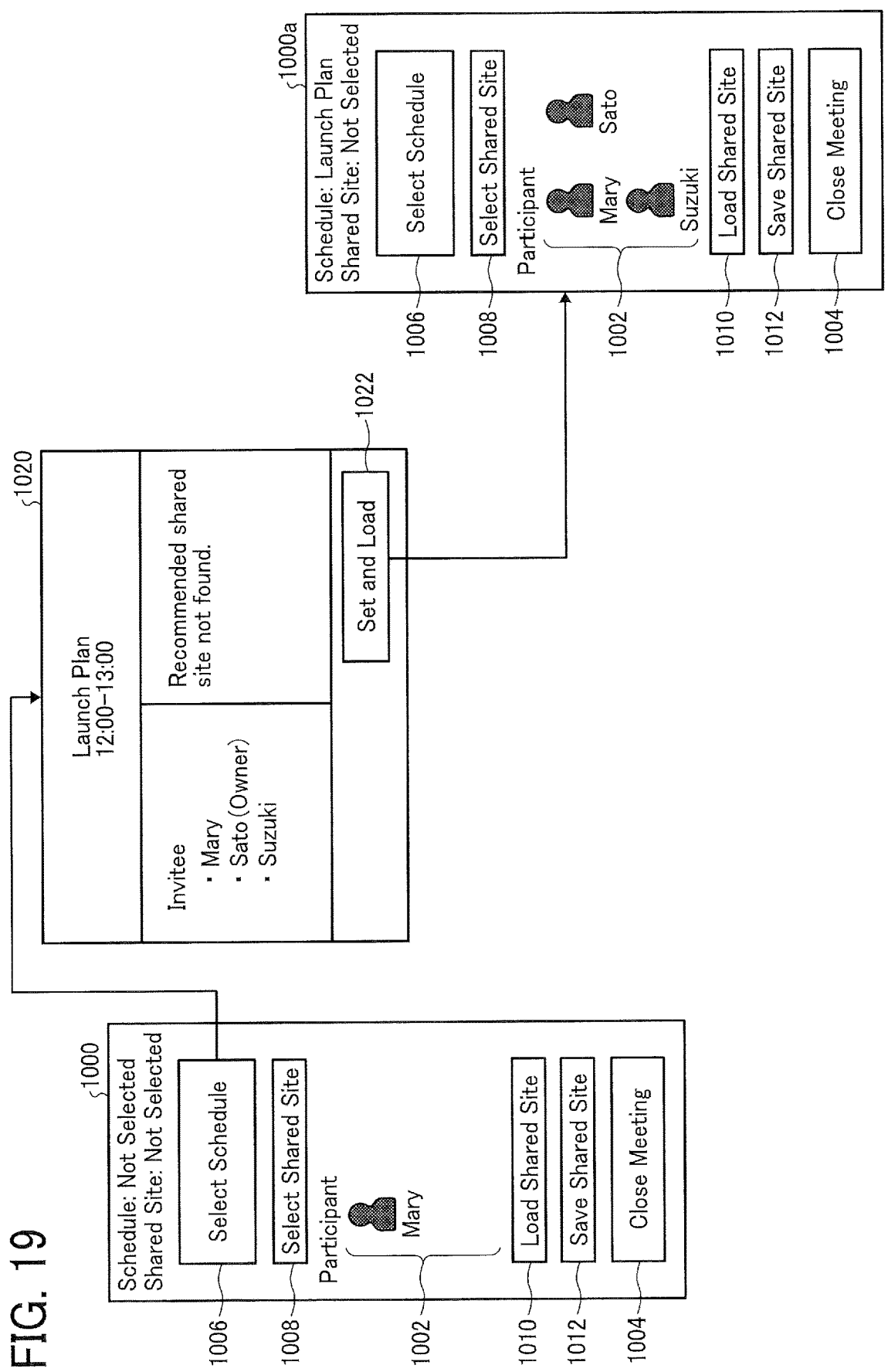
FIG. 19 is a diagram illustrating an example of UI displayed on the electronic whiteboard.

In step S66, if shared site name is not set in "site_name" of the suggested shared site list, the electronic whiteboard 14 indicates that there is no shared site, as illustrated in the schedule suggestion screen 1020 of FIG. 19. In this case, even if the set and load button 1022 is pressed, the shared site remains unselected as illustrated in the operation panel 1000a of FIG. 19. Further, by pressing the set and load button 1022 on the schedule suggestion screen 1020 of FIG.

19, the schedule displayed on the schedule suggestion screen 1020 is set as the schedule to be used. On the operation panel 1000a of FIG. 19, the invitees of the set schedule are added to the participant list 1002. FIG. 19 is a diagram illustrating an example of the UI displayed on the electronic whiteboard 14.

Figure 17:
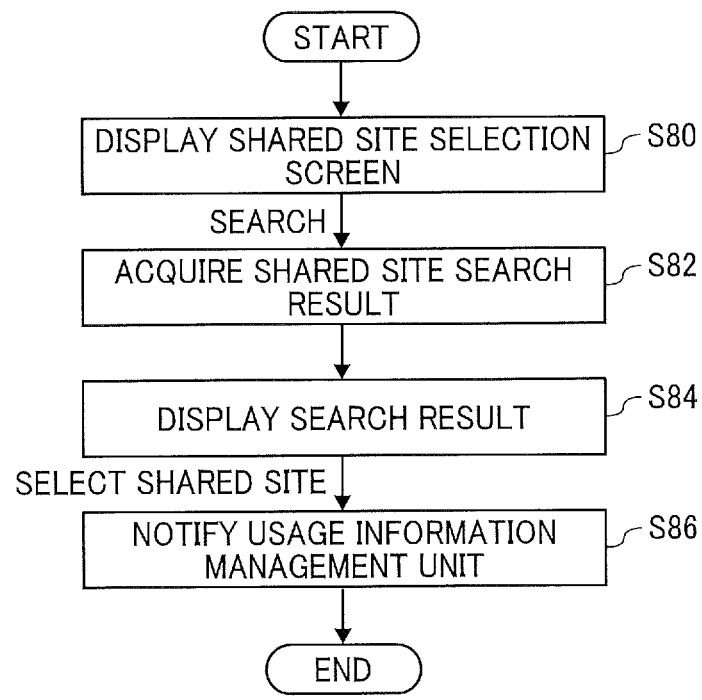
FIG. 17 is a flowchart illustrating a shared site selection process.

Returning to step S22 of FIG. 14, it is assumed that the electronic whiteboard 14 received the pressing of the shared site selection button 1008. In response to pressing of the shared site selection button 1008, the shared site management unit 42 of the electronic whiteboard 14 starts the shared site selection. FIG. 17 is a flowchart illustrating an example of a shared site selection process.

Figure 20:
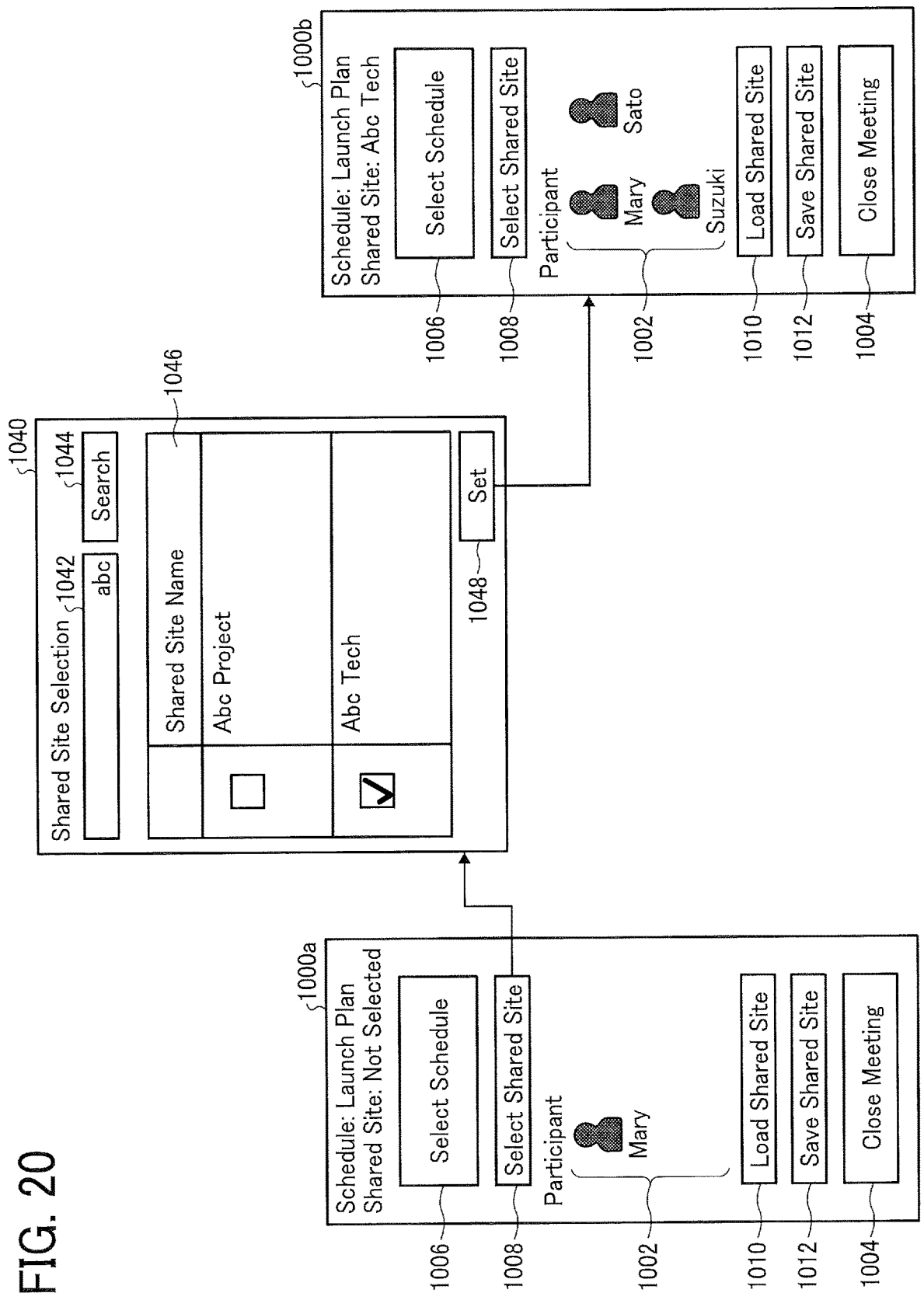
FIG. 20 is a diagram illustrating an example of UI displayed on the electronic whiteboard.

In step S80, the electronic whiteboard 14 displays a shared site selection screen 1040 as illustrated in FIG. 20. FIG. 20 is a diagram illustrating an example of a UI displayed on the electronic whiteboard. On the shared site selection screen 1040, a search keyword input field 1042 for the shared site, a search button 1044, a search result display field 1046, and a setting button 1048 are displayed. The search result display field 1046 displays a shared site name and a check box for selecting a shared site.

In response to the pressing of the search button 1044 after the search keyword of the shared site is input in the input field 1042, the electronic whiteboard 14 uses, for example, the site search application programming interface (API), of the shared site service 32 to search for the shared site in step S82. The electronic whiteboard 14 acquires the search result of the shared site from the shared site service 32.

When searching for the shared site using the site search API of the shared site service 32, the external service authentication token included in the external service settings information (FIG. 8) of the schedule owner (or the organizer of the meeting) is designated (sent to the shared site service 32) to make a search request.

In step S84, the electronic whiteboard 14 displays the search result display field 1046 on the shared site selection screen 1040. By pressing the setting button 1048 on the shared site selection screen 1040 in FIG. 20, the shared site selected by the check box is set as the shared site to be used.

When the shared site to be used is set, the electronic whiteboard 14 notifies the usage information management unit 52 of the usage information storage server 16 of the shared site selection event and the device ID in step S86. Further, the electronic whiteboard 14 displays the set shared site as illustrated in the operation panel 1000b of FIG. 20.

Returning to step S24 of FIG. 14, the electronic whiteboard 14 displays a meeting screen and accepts an operation by the user such as writing on the electronic whiteboard 14.

In the description below, it is assumed that the electronic whiteboard 14 received pressing of the shared site load button 1010 on the operation panel 1000a in step S26. When the shared site load button 1010 is pressed, the shared site management unit 42 of the electronic whiteboard 14 displays the shared site load screen. On the shared site load screen, folders of the selected shared site is displayed as the load destination. When a shared site with "load_path" is selected, the load path becomes the default load destination. For example, when the user executes loading, the electronic whiteboard 14 loads the file from the load destination folder and display the contents of the file.

When the user executes loading, the shared site management unit 42 designates (transmits to the shared site service 32) the external service authentication token included in the external service settings information (FIG. 8) of the schedule owner (or the organizer of the meeting) and issues a site load request to the shared site service 32.

When the file is loaded from the load destination folder, the electronic whiteboard 14 notifies the usage information management unit 52 of the usage information storage server 16 of the load event from the shared site and the device ID.

Figure 21:
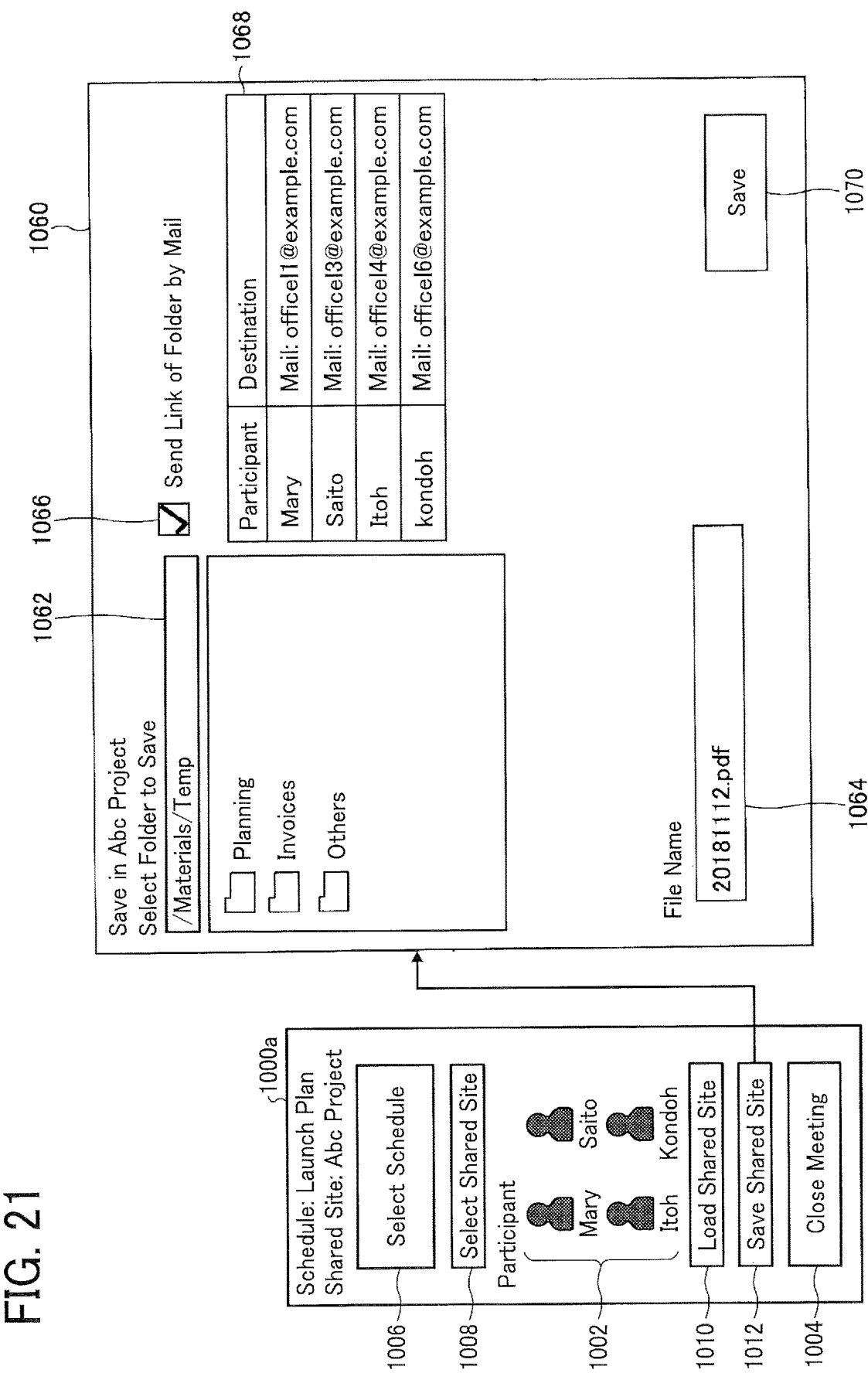
FIG. 21 is a diagram illustrating an example of UI displayed on the electronic whiteboard.

In step S28, it is assumed that the electronic whiteboard 14 received the pressing of the shared site save button 1012 on the operation panel 1000a. When the shared site save button 1012 is pressed, the shared site management unit 42 of the electronic whiteboard 14 displays a shared site save screen 1060 as illustrated in FIG. 21. FIG. 21 is a diagram illustrating an example of the UI displayed on the electronic whiteboard. On the shared site save screen 1060, a selection field 1062 for selecting a save destination folder from the selected shared site folders, a file name field 1064 for entering name of a file to save, and a check box 1066 for selecting whether or not to send a link of the saved file by an email, an email destination list 1068, and a save button 1070 are displayed.

When displaying the shared site save screen 1060, the electronic whiteboard 14 uses the participant management information list illustrated in FIG. 9 to display the email destination list 1068. In addition, the electronic whiteboard 14 acquires the information of the folder structure of the selected shared site from the shared site service 32, using the selected shared site name as a key. When a shared site with "save_path" is selected, the save path becomes the default save destination.

For example, when the user executes saving, the electronic whiteboard 14 saves the file with the shared site name and the path of the save destination folder as a key in order to save the file of the whiteboard content in the selected save destination folder. If the check box 1066 is selected to send the link of the saved file by email, the electronic whiteboard 14 transmits, for example, the storage notification email of FIG. 22 that includes the URL of the saved file to all the destinations in the email destination list 1068 or a part of the destinations selected by a check box or the like.

Figure 22:
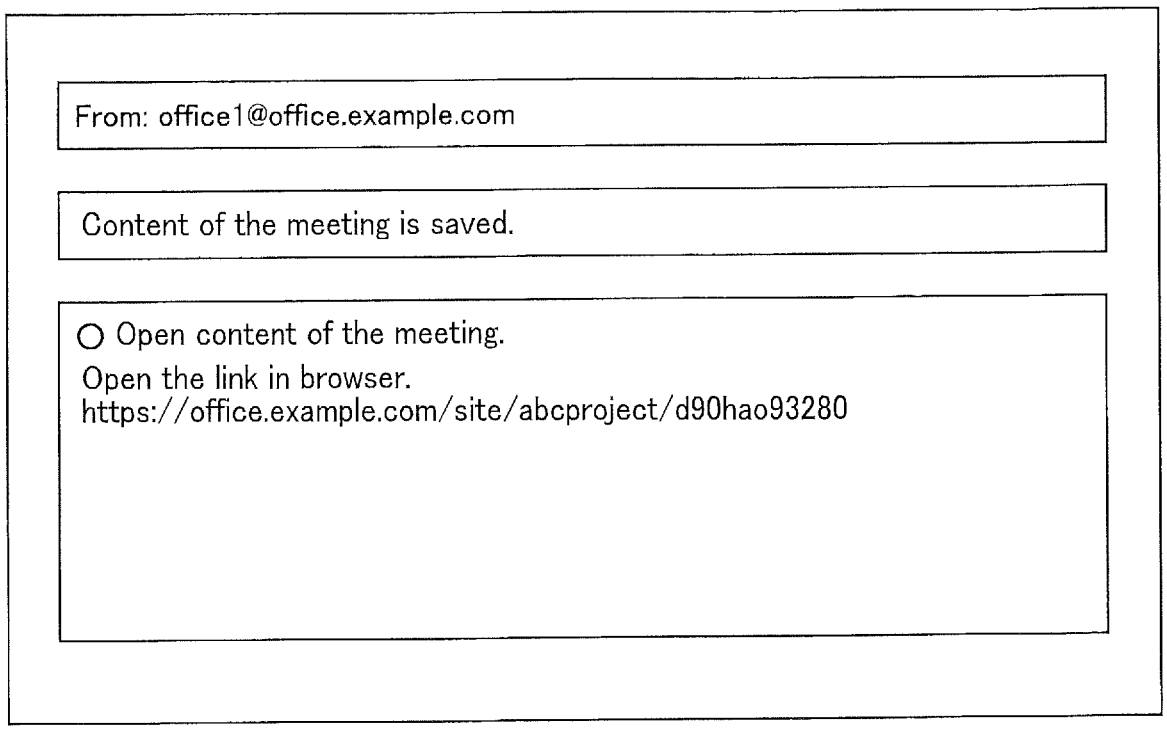
FIG. 22 is a diagram illustrating a storage notification email.

FIG. 22 is a diagram illustrating an example of a storage notification email. In the text of the storage notification email, a URL to open the file saved on the shared site is indicated. Note that URL is an example, and any information to open the file saved in the shared site may be indicated, for example, a shared site name and a file path. Further, a file of the whiteboard content may be attached on the storage notification email instead of the URL.

When a shared site with "save_path" is selected, the save path becomes the default save destination. When a file is saved in the save destination folder, the electronic whiteboard 14 notifies the usage information management unit 52 of the usage information storage server 16 of the saved path along with the device ID as a shared site save event.

Returning to step S30 of FIG. 14, it is assumed that the electronic whiteboard 14 accepted pressing of the meeting close button 1004 on the operation panel 1000a. When the meeting close button 1004 is pressed, the electronic whiteboard 14 notifies the usage information management unit 52 of the usage information storage server 16 of the meeting end event. In step S32 and step S34, the electronic whiteboard 14 finishes accepting the addition of the participant and notifies the usage information management unit 52 of the usage information storage server 16.

Figure 23:
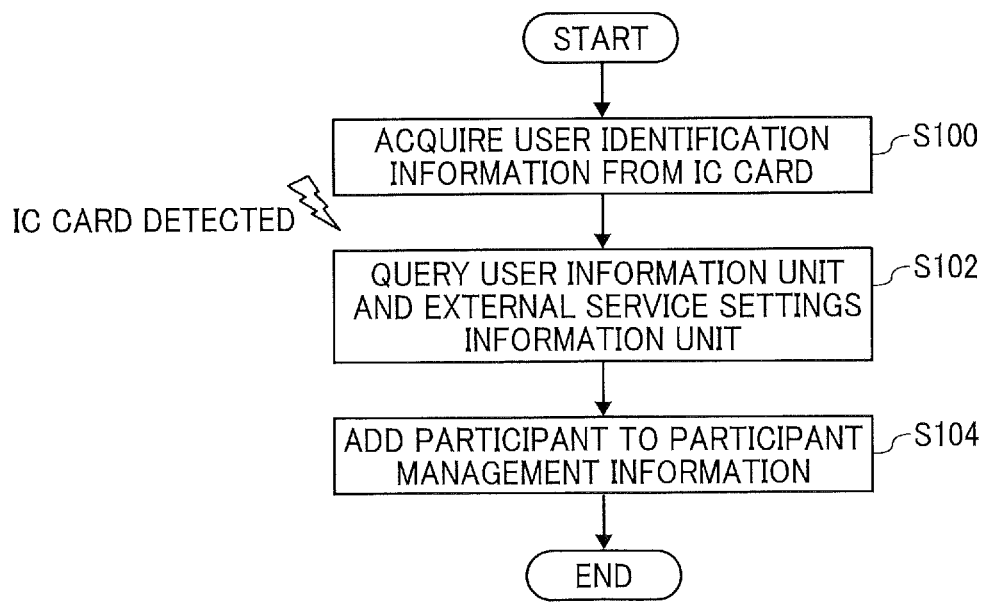
FIG. 23 is a flowchart illustrating a process for authenticating and setting an organizer.

In step S12 of FIG. 14, the organizer is authenticated and set as an organizer by the process illustrated in FIG. 23, for example. FIG. 23 is a flowchart illustrating an example of a process for authenticating and setting the organizer. FIG. 23 illustrates a process after the IC card detection unit 48 of the electronic whiteboard 14 detected the IC card 700 and read identification information from the IC card 700.

In step S100, the participant management unit 44 acquires the identification information read from the IC card 700 by the IC card detection unit 48. In step S102, the participant management unit 44 refers to the user information list illustrated in FIG. 7 and identifies the user indicated by the identification information acquired in step S100 from the user information list illustrated in FIG. 7. Further, the participant management unit 44 refers to the external service settings information illustrated in FIG. 8 and identifies the external service settings information of the identified user from the external service settings information illustrated in FIG. 8. In step S104, the participant management unit 44 sets the identified user as the organizer and adds the user to the participant list 1002.

For example, the IC card detection unit 48 that has detected the IC card 700 of "Mary Smith" illustrated in the user information list in FIG. 7 reads the identification information "ICCARD-123" from the IC card 700. In step S100, the participant management unit 44 acquires the identification information "ICCARD-123" from the IC card detection unit 48. In step S102, the participant management unit 44 queries the external service settings information unit 20 and the user information unit 22 of the user information server 10 based on the acquired identification information "ICCARD-123".

The user information unit 22 searches the identification information "ICCARD-123", identifies the user information including the user ID "user001", and returns the user information to the participant management unit 44 of the electronic whiteboard 14. Further, the external service settings information unit 20 searches the identified user ID "user001", identifies the external service settings information "connect1a" illustrated in FIG. 8 and returns the external service settings information to the participant management unit 44 of the electronic whiteboard 14.

In addition, the participant management unit 44 queries the external service settings information unit 20 about the email address of the external service settings information "connect1a". The external service settings information unit 20 uses the external service authentication token "eyJhbGc11 . . . " of the external service settings information "connect1a" and identifies the email address "office1@office.example.com" of the user ID "office1" from the user service 30 and returns the email address to the participant management unit 44 of the electronic whiteboard 14.

In step S104, the participant management unit 44 stores the user with the user ID "user001" as the organizer in the participant management information list of FIG. 9, adds the user "user001" to the participant list 1002, and associates the external service settings information "connect1a" with the user "user001". As a result, the meeting organizer "Mary Smith" is registered in the participant management unit 44, and the user ID "user001", the external service setting ID "connect1a", and the email address "Office1@office.example.com" are added to the participant management information list illustrated in FIG. 9 in association with each other.

Figure 24:
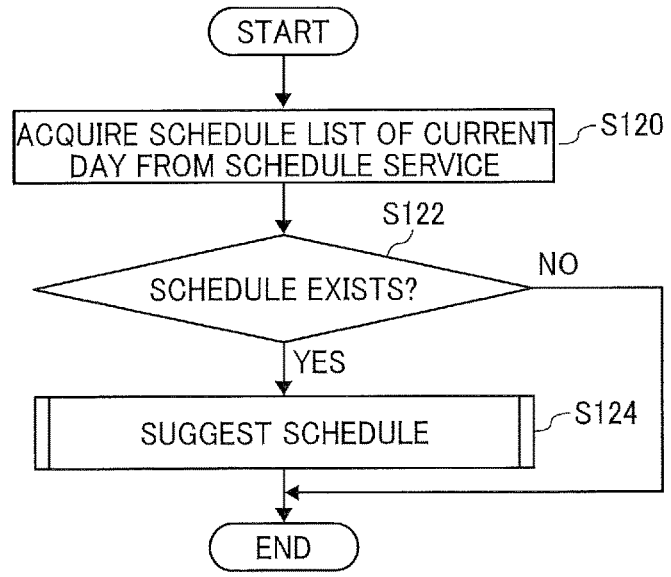
FIG. 24 is a flowchart illustrating a process of acquiring and suggesting a schedule.

In step S60 of FIG. 16, a schedule is acquired and suggested, for example, in the process illustrated in FIG. 24. FIG. 24 is a flowchart illustrating a process of acquiring and suggesting a schedule.

In step S120, the meeting schedule setting unit 40 of the electronic whiteboard 14 acquires the meeting schedule included in the organizer's current day schedule information from the schedule service 34 based on the organizer user ID acquired by the authentication.

The meeting schedule setting unit 40 acquires the external service settings information of the organizer from the user information server 10 based on the organizer's user ID acquired by authentication, and based on the acquired external service settings information of the organizer, acquires from the schedule service 34, the user's meeting schedule information of the current day identified by the external service settings information.

Alternatively, the meeting schedule setting unit 40 may request the user information server 10 to acquire the schedule information by simply designating the user ID of the organizer without acquiring the external service settings information. The user information server 10 identifies the external service settings information based on the acquired organizer user ID, acquires the schedule information from the schedule service 34 based on the identified external service settings information, and returns the acquired schedule information to the electronic whiteboard 14. That is, the electronic whiteboard 14 may acquire the schedule information from the schedule service 34 through another server or the like without directly exchanging information with the schedule service 34.

In step S122, the meeting schedule setting unit 40 determines whether there is a meeting schedule acquired in step S120. If there is no meeting schedule, the meeting schedule setting unit 40 skips the process of step S124. If there is a meeting schedule, the meeting schedule setting unit 40 executes the schedule suggestion process in step S124 as illustrated in FIG. 25, for example.

Figure 25:
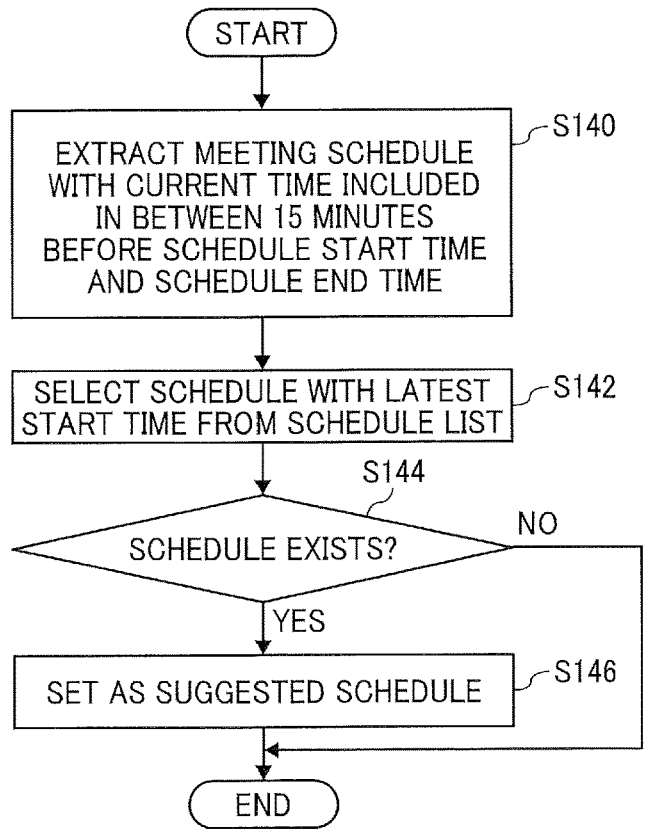
FIG. 25 is a flowchart illustrating a process of suggesting the schedule.

FIG. 25 is a flowchart illustrating a process of suggesting the schedule. In step S140, the meeting schedule setting unit 40 extracts a meeting schedule with the "start time and period" close to the current time from the organizer's meeting schedule of the current day acquired in step S120. For example, the meeting schedule setting unit 40 extracts a meeting schedule in which the current time is included between 15 minutes before the scheduled start time and the scheduled end time. Since there may be a plurality of meeting schedules extracted in step S140, the meeting schedule setting unit 40 extracts a meeting schedule having the latest scheduled start time from the extracted meeting schedules in step S142.

In step S144, the meeting schedule setting unit 40 determines whether there is a meeting schedule extracted in step S142. If there is a meeting schedule extracted in step S142, the meeting schedule setting unit 40 proceeds to step S146 and sets the meeting schedule as the schedule to suggest. If there is no meeting schedule extracted in step S142, the meeting schedule setting unit 40 skips the process of step S146.

For example, in step S120, the meeting schedule setting unit 40 of the electronic whiteboard 14 uses the external service settings information "connect1a" of the organizer "Mary Smith" having the user ID "user001" returned from the user information server 10 to acquire from the schedule service 34, the meeting schedules having the schedule IDs "sch-1" and "sch-2" included in the schedule information of the organizer for the current day. The meeting schedule setting unit 40 determines whether there is a meeting schedule acquired in step S120.

A plurality of meeting schedules may be acquired as in the example described above in which meeting schedules having the schedule IDs "sch-1" and "sch-2" are acquired. In sch case, one schedule is selected and suggested to the user.

The meeting schedule setting unit 40 executes the schedule suggestion process in step S124 as illustrated in FIG. 18, for example.

For example, it is assumed that the user entered the meeting room at 11:55 on Nov. 10, 2018, and the electronic whiteboard 14 is activated. In step S140, the meeting schedule setting unit 40 extracts a meeting schedule having the schedule ID "sch-1" whose start time and period are closer to the current time "Nov. 10, 2018 11:55" from the meeting schedules having the schedule IDs "sch-1" and "sch-2" in the organizer's meeting schedules of the current day acquired in step S120.

In general, a meeting room or a meeting space is often reserved and operated in units of 30 minutes, such as 30 minutes and 60 minutes. The extraction condition of the meeting schedule described in step S140 is flexible enough even when entering the meeting room a little early and starting the meeting as in the above example, or when entering the meeting room a little late.

Further, since the threshold is set at 15 minutes, which is half of the time unit of the meeting (30 minutes), even if the meeting in the huddle format is started without setting the meeting schedule at 9:30, the meeting scheduled at 12:00 is not mistakenly suggested. The time allocated for preparation of a meeting seems reasonable because it is rare to start the preparation before 15 minutes of the scheduled start time.

These extraction conditions may be changeable by the setting of the organizer. If a plurality of meeting schedules are extracted in step S140, a suggested schedule is not set and the schedule suggestion screen 1020 is not displayed.

Figure 26:
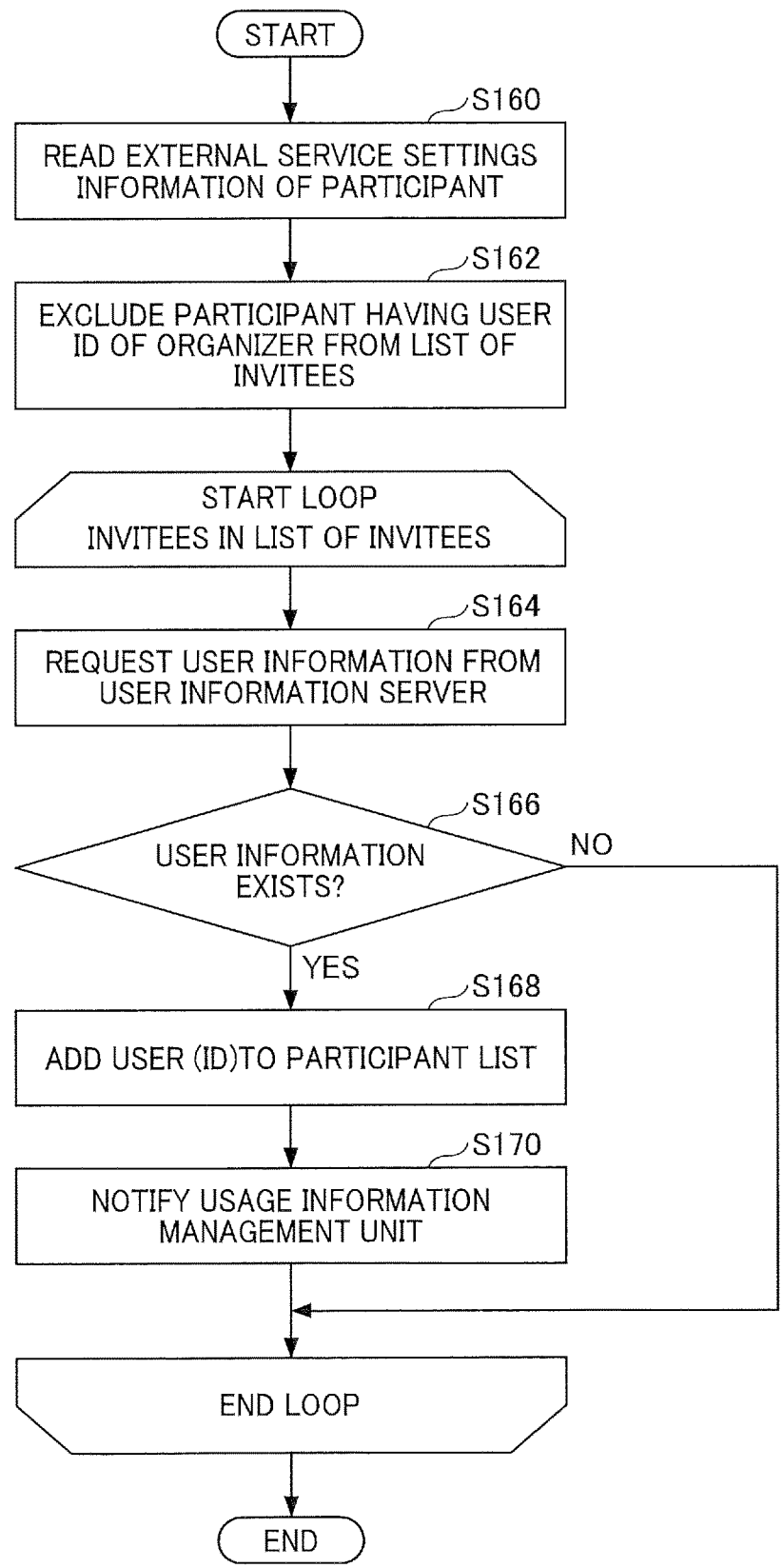
FIG. 26 is a flowchart illustrating an example of a process for adding an invitee of a suggested meeting to a participant management information list.

In step S70 of FIG. 16, a process of adding the invitee of the suggested meeting to the participant management information list of FIG. 9, for example, in the process illustrated in FIG. 26, is performed. FIG. 26 is a flowchart illustrating an example of the process for adding an invitee of the suggested meeting to the participant management information list.

In step S160, the participant management unit 44 queries the external service settings information unit 20 for the external service settings information of the current participant. In step S162, the participant management unit 44 excludes, from the list of invitees included in the schedule information of the organizer, the invitee who has the user ID of the organizer.

The process of steps S164 to S170 is executed for all the invitees included in the list of invitees with the organizer's user ID excluded in step S162. In step S164, the participant management unit 44 queries the user information unit 22 of the user information corresponding to the external service user ID of the invitee.

When user information corresponding to the external service user ID exists, the participant management unit 44 adds the user ID of the invitee to the participant management information list of FIG. 9 in step S168. Then, the participant management unit 44 notifies the usage information management unit 52 of the usage information storage server 16 of the addition of the participant as the use start event. When user information corresponding to the external service user ID does not exist, the participant management unit 44 skips step S168.

For example, when the set and load button 1022 of the schedule suggestion screen 1020 illustrated in FIG. 18 is pressed, the process proceeds to step S160, and the participant management unit 44 queries the external service settings information unit 20 for the external service settings information "connect1a" of the current participant (organizer). Also, when the shared site load button 1010 on the operation panel 1000a is pressed after the set and load button 1022 in FIG. 18 is pressed, the same load process is executed.

In step S162, the participant management unit 44 excludes "office1" which is the external service user ID of the organizer from the invitee included in the schedule information of the organizer "user001".

In step S164, the participant management unit 44 queries the user information server 10 for user information corresponding to the external service user IDs of the remaining invitees "office2" and "office5".

Since the user information server 10 has the user IDs "user002" and "user005" corresponding to the external service user IDs "office2" and "office5", the user IDs "user002" and "user005" are returned to the participant management unit 44. In step S168, the participant management unit 44 adds the user IDs "user002" and "user005" to the participant management information list.

In the present embodiment, the schedule information registered in the schedule service 34 of the organizer is set and loaded as the meeting schedule of the electronic whiteboard 14. As a result, a participant who has not been authenticated by the IC card 700, or a participant without the IC card 700 may participate in the meeting with ease.

As described above, according to the first embodiment, a shared site corresponding to information (schedule name, schedule owner, invitee, etc.) included in the meeting schedule of the organizer is suggested as a shared site to be used in the meeting, by associating the meeting with the shared site as shared site information based on the usage information of the electronic whiteboard 14. Therefore, according to the first embodiment, even when there are a plurality of shared sites, selecting the shared site corresponding to the meeting on the electronic whiteboard 14 is facilitated.

In the first embodiment, the example of the extraction condition for extracting the suggested shared site based on the schedule name, the schedule owner, and the participants is described. In a second embodiment, an example is described of the extraction condition for extracting the shared site associated with the search keyword included in the suggested schedule name as the suggested shared site by storing the search keyword used to search the shared site and the shared site selected from the search results based on the search keyword are associated with each other. An example of extraction conditions for extracting the shared site associated with the search keyword included in the suggested schedule name as the suggested shared site is described below.

Note that the device owner in the second embodiment corresponds to the organizer in the first embodiment. The device owner may be a user who is authenticated first in a meeting or a user who made an input indicating that the user is the organizer through a screen displayed by the electronic whiteboard 14 at any timing after user authentication. Note that the second embodiment is the same as the first embodiment except for a part thereof, and thus description thereof is omitted as appropriate. For example, the information processing system 1 according to the second embodiment is the same as the configuration diagram illustrated in FIG. 1. The hardware configuration diagram according to the second embodiment is the same as the block diagrams illustrated in FIGS. 2 and 3.

Here, an information processing system 1 according to the second embodiment is described using the functional configuration illustrated in FIG. 4.

The information processing system 1 according to the second embodiment includes a user information server 10, an external service group system 12, an electronic whiteboard 14, and a usage information storage server 16 as in the first embodiment.

The external service group system 12 exemplifies a user service 30, a shared site service 32, a schedule service 34, and an email service 36 as external service groups provided to the user. The user service 30 of the external service group system 12 stores, for example, account information as illustrated in FIG. 5. The shared site service 32 provides a shared site.

The schedule service 34 stores schedule information as illustrated in FIG. 27, for example. FIG. 27 is a diagram illustrating an example of the schedule information. The schedule service 34 manages the user's action schedule and meeting schedule based on the schedule information illustrated in FIG. 27.

As illustrated in FIG. 27, the schedule service 34 stores schedule ID, schedule name, schedule type, schedule owner, start time and period, and invitee as the schedule information. Note that the items in the schedule information are the same as the schedule information in FIG. 6, description thereof is omitted.

The email service 36 stores an email address for each user in the external service group system 12 and provides an email function to the user. The email service 36 stores emails addressed to the user's email address in the external service group system 12.

The user information server 10 includes an external service settings information unit 20 and a user information unit 22. The user information unit 22 stores the user information list illustrated in FIG. 7, for example. The external service settings information unit 20 stores the external service settings information illustrated in FIG. 8, for example.

The electronic whiteboard 14 includes a meeting schedule setting unit 40, a shared site management unit 42, a participant management unit 44, a writing display unit 46, and an IC card detection unit 48. The IC card detection unit 48 reads the identification information from the detected IC card 700 of the user. The participant management unit 44 manages participants of a meeting in a participant management information list as illustrated in FIG. 9, for example. The participant management unit 44 identifies the user information from the user information list of FIG. 7 using the identification information read by the IC card detection unit 48 and stores the user ID of the identified user information as the user ID of the participant in the participant management information list.

The participant management unit 44 transmits notification to the usage information management unit 52 of the usage information storage server 16. A device ID of the electronic whiteboard 14 is included in each notification. The writing display unit 46 accepts the user's writing on the electronic whiteboard 14 and displays the contents of the writing. The shared site management unit 42 displays a shared site selection screen 1040 described above. On the shared site selection screen, shared sites are searched, and a shared site is selected from the search result.

When the shared site is selected, the shared site management unit 42 notifies the usage information management unit 52 of the usage information storage server 16 of the search keyword used for the search, name of the shared site selected from the search results by the search keyword, and the device ID of the electronic whiteboard 14. Further, the shared site management unit 42 displays a shared site save screen 1060. The shared site save screen saves the contents written in the electronic whiteboard 14 as a file to the shared site and transmits a URL of the saved file by an email.

The meeting schedule setting unit 40 has a user interface for setting a meeting schedule and communicates with the schedule service 34 to acquire the schedule information illustrated in FIG. 27. In addition, the meeting schedule setting unit 40 selects a meeting schedule from a plurality of user's schedule information and suggests the selected meeting schedule by displaying the schedule on the schedule suggestion screen 1020 as described in the first embodiment.

The schedule suggestion screen 1020 displays the schedule name of the meeting, the schedule owner, the participants, and the suggested shared site name. The suggested shared site name is displayed according to the suggested shared site list obtained as a result of transmitting the schedule name and schedule owner of the meeting to the shared site information management unit 50 of the usage information storage server 16, as described below. When the schedule is set, the meeting schedule setting unit 40 notifies the usage information management unit 52 of the usage information storage server 16 of the device ID of the electronic whiteboard 14, the schedule name, and the schedule owner.

The usage information storage server 16 includes a shared site information management unit 50, a usage information management unit 52, a shared site information storage unit 54, and an electronic whiteboard usage information storage unit 56. The usage information management unit 52 stores, for example, the electronic whiteboard usage information illustrated in FIG. 28 in the electronic whiteboard usage information storage unit 56. FIG. 28 is a diagram illustrating an example of the electronic whiteboard usage information. As illustrated in FIG. 28, the electronic whiteboard usage information stores a device ID, date and time, and event. When the usage information management unit 52 receives the notification from the meeting schedule setting unit 40, the shared site management unit 42, and the participant management unit 44, the usage information management unit 52 adds the notified information to the electronic whiteboard usage information in FIG. 28.

FIG. 28 illustrates an example of the usage information used up to "15:55 on Nov. 10, 2018" on the electronic whiteboard 14 with the device ID "K100029". Note that in FIG. 28, in addition to the meeting start event, the meeting end event, the use start event of the electronic whiteboard 14, the schedule set event, the shared site selection event, the shared site save event, and the schedule owner notification event as illustrated in FIG. 10, a shared site search event indicated as "Search by Abe" is included.

For example, the event "Search by Abc" and the event "Select site Abe Tech" illustrated in FIG. 28 indicate that the shared site "Abc Tech" is selected from the search results by the search keyword "Abc".

For example, the event "Search by Abe" and the event "Select site Abe Project" illustrated in FIG. 28 indicate that the shared site "Abc Project" is selected from the search results by the search keyword "Abe".

For example, in FIG. 28, Mary, having the user ID "user001" held the IC card 700 over the IC card reader 617 at "12:01" and started using the electronic whiteboard 14 having the device ID "K100029". Further, the schedule having the schedule ID "sch-1" is set at "12:02".

At the same time, Sato having the user ID "user002" and Suzuki having the user ID "user005" held the IC card 700 over the IC card reader 617 and started using the electronic whiteboard 14 having the device ID "K100029". In addition, a shared site is searched with the search keyword "Abe" at "12:05", and the shared site with the shared site name "Abe Tech" is selected from the search results.

Further, in FIG. 28, Mary having the user ID "user001" held the IC card 700 over the IC card reader 617 at "15:01" and started using the electronic whiteboard 14 having the device ID "K100029". In addition, the schedule having the schedule ID "sch-2" is set at "15:02". At the same time, Saito having the user ID "user003" and Itoh having the user ID "user004" each held the IC card 700 of his or her own over the IC card reader 617 and started using the electronic whiteboard 14 having the device ID "K100029". In addition, a shared site is searched with the search keyword "Abe" at "15:05", and the shared site with the name "Abe Project" is selected from the search results.

The shared site information management unit 50 stores, for example, the shared site information illustrated in FIG. 29 in the shared site information storage unit 54. FIG. 29 is a diagram illustrating an example of the shared site information. The shared site information is created based on the electronic whiteboard usage information illustrated in FIG. 28. As illustrated in FIG. 29, the shared site information stores a shared site name, a keyword, a device owner, a latest usage date and time, and the number of usages.

The shared site name is a name of the shared site. The keyword is a search keyword used to search the shared site. The device owner is the owner of the meeting using the shared site. The latest usage date and time is the latest end time of the meeting among the end times of the meetings using the shared site with the same shared site name and device owner. The number of usages is the number of times a meeting is held using the same shared site and the same device owner.

For example, in the meeting illustrated in FIG. 29, in which the shared site with the shared site name "Abe Project" selected from the search results with the search keyword "abc" is selected for the electronic whiteboard usage information up to "Nov. 10, 2018 16:00", the device owner "user001", the latest usage date and time "Nov. 10, 2018 15:55" and the number of usages "1" are stored in association with each other. Further, for example, in the electronic whiteboard usage information up to "Nov. 10, 2018 16:00" illustrated in FIG. 29, the shared site with the shared site name "Abc Tech" selected from the search results by the search keyword "abc" is described. In the selected meeting, the device owner "user001", the latest usage date and time "Nov. 10, 2018 12:50", and the number of usages "1" are stored in association with each other. As the latest usage date and time, the time of the meeting end event is used. In the shared site information of FIG. 29, information associated with a different keyword or a different device owner is stored in a different row.

The shared site information management unit 50 acquires the electronic whiteboard usage information from the usage information management unit 52 at any timing, for example, once an hour, determines the shared site name selected from the search results, the search keyword used for the search, the device owner, the latest usage date and time, and the number of usages, and updates the shared site information in FIG. 29.

Further, the shared site information management unit 50 returns to the meeting schedule setting unit 40, a suggested shared site list as illustrated in FIG. 30, based on the schedule name and the schedule owner (the device owner) transmitted from the meeting schedule setting unit 40 of the electronic whiteboard 14.

FIG. 30 is a diagram illustrating the suggested shared site list returned by the shared site information management unit 50. FIG. 30 illustrates an example of the suggested shared site list, when a schedule name "Abe Project", and a device owner "user001", are transmitted from the shared site information in FIG. 29.

"Primary" in FIG. 30 indicates that the name of the most recommended shared site is "Abc Project". "Site_name" indicates a list of suggested shared sites "Abe Project" and "Abc Tech".

Here, "primary" is the shared site in which the device owners are the same, the search keyword is included in the schedule name, and the shared site information is associated with the latest usage date and time. As a result, the shared site used in the most recent meeting among the meetings convened by the same user becomes "primary". Instead of the shared site used in the most recent meeting, the shared site used in the most frequent meetings may be set as "primary". Further, "site_name" is a shared site associated with shared site information in which the device owners are the same and the search keyword is included in the schedule name.

The search keyword may be considered to be included in the schedule name even if exact same character string as the search keyword is included in the schedule name. For example, if there is a difference between lowercase letters and uppercase letters, or if the search keyword is in a foreign language and the schedule name contains the English translation of the search keyword, etc. the search keyword may be considered to be included in the schedule name. Further, even if the schedule name does not include the search keyword, a shared site may be considered "primary" if it is determined by some methods that the search keyword and the schedule name have a relationship. In this case, even when the number of usages is counted at the time of creating the shared site information illustrated in FIG. 29, instead of counting only the number of usages with exactly the same search keyword, the number of usages may be counted if the keywords are determined to have some relationship.

In the present embodiment, the shared site information management unit 50 acquires the schedule name and the device owner and determines the suggested shared site list. Alternatively, the usage information management unit 52 may acquire the shared site information and may determine the suggested shared site list.

Figure 31:
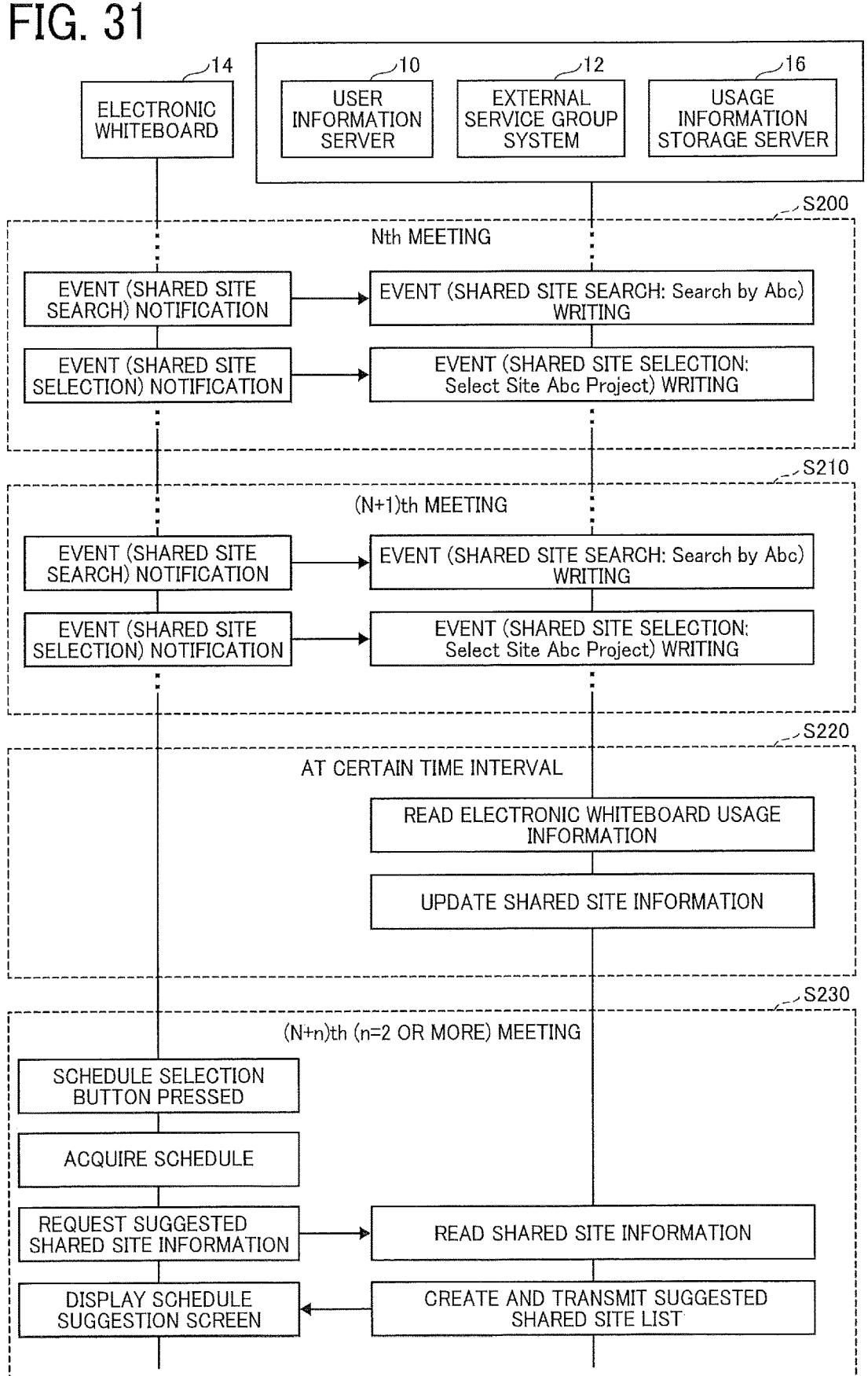
FIG. 31 is a flowchart illustrating an example of a process executed by the information processing system according to the present embodiment.

The information processing system 1 according to the second embodiment acquires the electronic whiteboard usage information of FIG. 28 by the event notification of the held meeting, for example, as illustrated in the flowchart of FIG. 31, and updates the shared site information in FIG. 29 based on the electronic whiteboard usage information. In the information processing system 1 according to the second embodiment, the suggested shared site list as illustrated in FIG. 30 created from the shared site information of FIG. 29 is transmitted to the electronic whiteboard 14 when a new meeting is held.

In step S200 the electronic whiteboard 14 notifies the usage information storage server 16 of the events in the Nth meeting, and the event information is stored in the electronic whiteboard usage information storage unit 56 by the usage information management unit 52. In FIG. 31, among the events notified from the electronic whiteboard 14 to the usage information storage server 16, a shared site search event and a shared site selection event are illustrated.

Step S210 in FIG. 31 illustrates the event notified from the electronic whiteboard 14 to the usage information storage server 16 in the N+first meeting stored in the electronic whiteboard usage information storage unit 56 by the usage information management unit 52. In FIG. 31, among the events notified from the electronic whiteboard 14 to the usage information storage server 16, a shared site search event and a shared site selection event are illustrated.

The process of step S220 is repeated at a certain interval (for example, once an hour). The shared site information management unit 50 of the usage information storage server 16 acquires the electronic whiteboard usage information from the usage information management unit 52 at the certain time intervals and updates the shared site information illustrated in FIG. 29.

In step S230, the N+n (where n is 2 or more) the meeting is held. When the schedule selection button 1006 on the operation panel 1000 is pressed, the electronic whiteboard 14 sets the suggested schedule from the schedule information acquired from the external service group system 12 as described above. Then, the electronic whiteboard 14 transmits the schedule name of the suggested schedule and the device owner to the usage information storage server 16 to request the suggested shared site information.

The usage information storage server 16 creates a suggested shared site list illustrated in FIG. 30, for example, based on the schedule name of the suggested schedule received from the electronic whiteboard 14 and the device owner, and notifies the electronic whiteboard 14 of the suggested shared site list. The electronic whiteboard 14 displays a schedule suggestion screen 1020 according to the received suggested shared site list.

Note that although FIG. 31 illustrates an example in which the electronic whiteboard 14 is one, a plurality of electronic whiteboards 14 may be provided, and for example, the Nth, N+first, and N+nth meetings may be performed by another electronic whiteboard 14, or the same electronic whiteboard 14 may be used.

Further, the process of holding the N+nth meeting illustrated in step S230 is specifically described below. Here, description is given using the flowchart illustrated in FIG. 14 described above.

In step S10, when the electronic whiteboard 14 is activated, the electronic whiteboard 14 displays, for example, the operation panel 1000 illustrated in FIG. 13, and waits for login by the IC card 700. The organizer of the meeting holds his or her IC card 700 over the IC card detection unit 48.

When the IC card detection unit 48 detects the IC card 700, the electronic whiteboard 14 identifies user information from the identification information read from the IC card 700, authenticates, and sets the user as an organizer in step S12.

In step S14, the participant management unit 44 adds the authenticated user to the participant management information list as the organizer. In addition, the participant management unit 44 notifies the usage information management unit 52 of the usage information storage server 16 of the device ID, the time, the meeting start event, and the event of the use start event.

Figure 32:
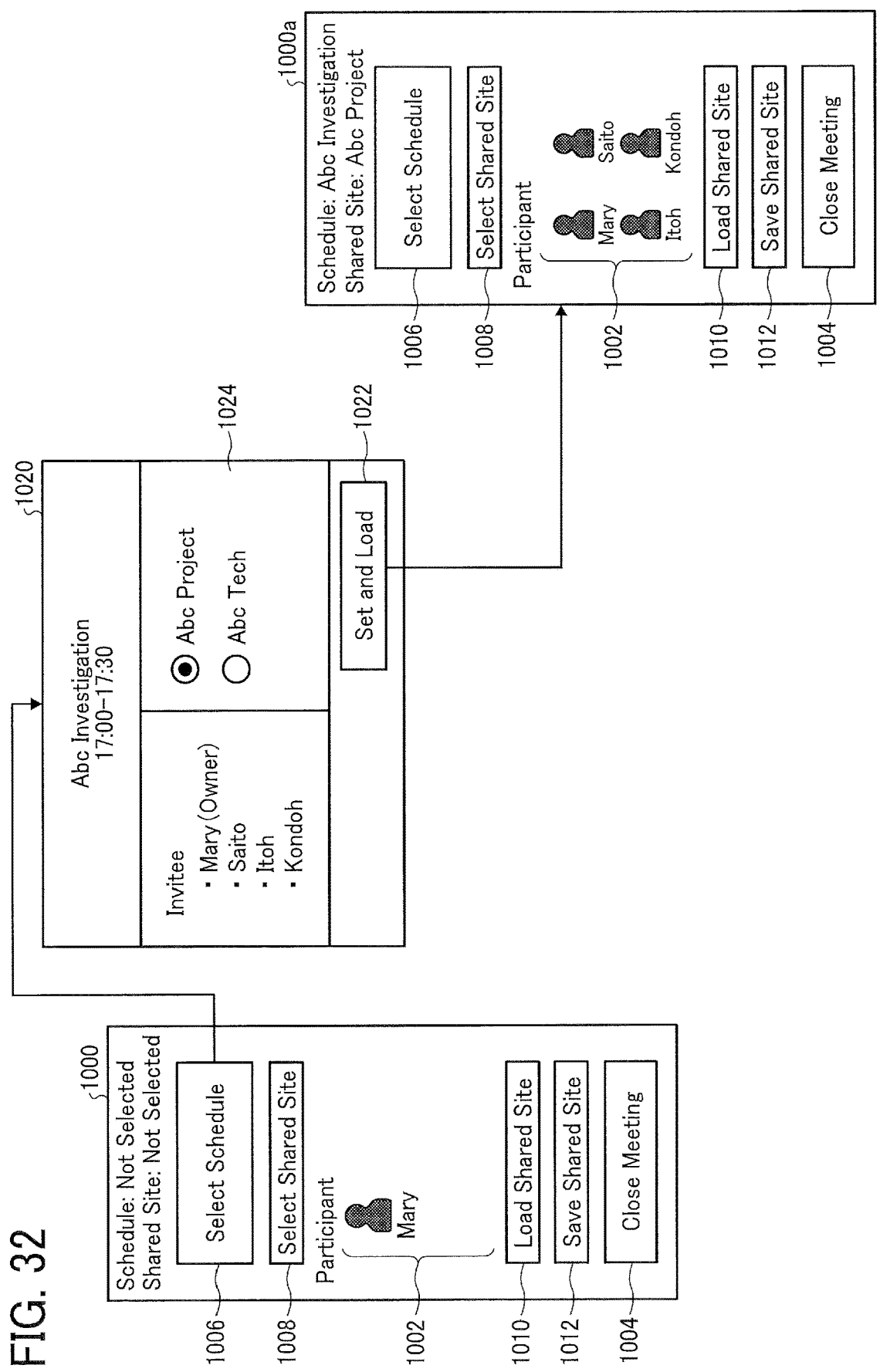
FIG. 32 is a diagram illustrating an example of the UI displayed on the electronic whiteboard.

In step S16, the electronic whiteboard 14 displays, for example, an operation panel 1000 as illustrated in FIG. 32 as a UI. FIG. 32 is a diagram illustrating an example of the UI displayed on the electronic whiteboard 14. Note that the operation panel 1000 of FIG. 32 is the same as the operation panel 1000 of FIG. 18, so description thereof is omitted.

In step S18, the electronic whiteboard 14 starts accepting additional participants. When the process of accepting additional participants is started, the electronic whiteboard 14 waits for a login by a user other than the organizer, performed by using the IC card 700 and the like.

The user other than the organizer holds his or her IC card 700 over the IC card detection unit 48. When detecting the IC card 700, the electronic whiteboard 14 identifies the user information from the identification information read from the IC card 700, authenticates, and sets the user as a participant of the meeting. The electronic whiteboard 14 adds the user who has been authenticated and set as the participant to the participant list 1002. Further, the electronic whiteboard 14 notifies the usage information management unit 52 of the usage information storage server 16 and the device ID of the use start event by the added participant.

In step S20, it is assumed that the electronic whiteboard 14 received pressing of the schedule selection button 1006. In response to the pressing of the schedule selection button 1006, the electronic whiteboard 14 starts selecting a schedule. The electronic whiteboard 14 acquires the schedule information of the organizer from the schedule service 34. The electronic whiteboard 14 acquires the participant management information list of FIG. 9.

The electronic whiteboard 14 transmits the schedule name of the suggested schedule and the device owner to the usage information storage server 16 to request the suggested shared site list. The electronic whiteboard 14 uses the schedule information and the suggested shared site list to display the schedule suggestion screen 1020 of FIG. 32. The schedule suggestion screen 1020 of FIG. 32 displays the schedule name, start time, end time, device owner, invitee, and suggested shared site 1024 of the suggested schedule.

Similar to the suggested shared site 1024 of FIG. 18, the suggested shared site 1024 of FIG. 32 is displayed in a state where the shared site name set in "site_name" in the suggested shared site list is selectable. Also, similar to the suggested shared site 1024 of FIG. 18, for example, when "primary" is set in the suggested shared site list, the most recommended shared site name is selected by default in the suggested shared site 1024 of FIG. 32.

When the schedule and the shared site are set, the electronic whiteboard 14 notifies the usage information management unit 52 of the usage information storage server 16 of the set schedule and shared site as the schedule set event and the shared site selection event together with the device ID.

In addition, the electronic whiteboard 14 displays the set schedule and shared site on the operation panel 1000a as illustrated in FIG. 32 and adds the invitee of the schedule without duplication to the participant list 1002. In addition, the added participant is added to the participant management information list of FIG. 9 and notified to the usage information management unit 52 of the usage information storage server 16 by a use start event.

If no shared site name is set in "site_name" of the suggested shared site list, the electronic whiteboard 14 indicates that there is no shared site, as illustrated in the schedule suggestion screen 1020 of FIG. 19.

When the shared site selection button 1008 is pressed in step S22, the shared site selection process is executed as described with reference to FIG. 17. The electronic whiteboard 14 displays the shared site selection screen 1040 illustrated in FIG. 20.

In response to the pressing of the search button 1044 after the search keyword of the shared site is input in the input field 1042, the electronic whiteboard 14 uses, for example, the site search application programming interface (API), of the shared site service 32 to search for the shared site. The electronic whiteboard 14 acquires the search result of the shared site from the shared site service 32.

The electronic whiteboard 14 displays the search result display field 1046 on the shared site selection screen 1040. By pressing the setting button 1048 on the shared site selection screen 1040 in FIG. 20, the shared site selected by the check box is set as the shared site to be used.

When the shared site to be used is set, the electronic whiteboard 14 notifies the usage information management unit 52 in the usage information storage server 16 of the device ID, the search keyword used for the search, and the name of the shared site selected by the user from the search result obtained by the search keyword. Further, the electronic whiteboard 14 displays the set shared site as illustrated in the operation panel 1000*b* of FIG. 20.

In step S24, the electronic whiteboard 14 displays a meeting screen and accepts an operation by the user such as writing on the electronic whiteboard 14.

In step S26, the electronic whiteboard 14 displays the shared site load screen when the shared site load button 1010 on the operation panel 1000*a* is pressed. For example, when the user executes loading, the electronic whiteboard 14 loads the file from the load destination folder and display the contents of the file.

When the file is loaded from the load destination folder, the electronic whiteboard 14 notifies the usage information management unit 52 of the usage information storage server 16 of the load event from the shared site and the device ID.

In step S28, when the shared site save button 1012 on the operation panel 1000*a* is pressed, the electronic whiteboard 14 displays the shared site save screen 1060 as illustrated in FIG. 21.

For example, when the user executes saving, the electronic whiteboard 14 saves the file with the shared site name and the path of the save destination folder as a key in order to save the whiteboard content in the selected save destination folder. At this time, the access to the shared site service 32 is made with the external service settings information of the device owner (organizer). The suggested shared site is used when the current device owner was also the device owner at the past meetings. The external service settings information of the device owner can be used for accessing the suggested shared site as long as the access right is not removed after the past meetings.

If the check box 1066 is selected to send the link of the saved file by email, the electronic whiteboard 14 transmits, for example, the storage notification email of FIG. 22 that includes the URL of the saved file to all the destinations in the email destination list 1068 or a part of the destinations selected by a check box or the like.

When a file is saved in the save destination folder, the electronic whiteboard 14 notifies the usage information management unit 52 of the usage information storage server 16 of the saved path along with the device ID as a shared site save event.

In step S30, it is assumed that the electronic whiteboard 14 received the pressing of the meeting close button 1004 on the operation panel 1000*a*. When the meeting close button 1004 is pressed, the electronic whiteboard 14 notifies the usage information management unit 52 of the usage information storage server 16 of the meeting end event. In step S32 and step S34, the electronic whiteboard 14 finishes accepting the addition of the participant and notifies the usage information management unit 52 of the usage information storage server 16.

Figure 33:
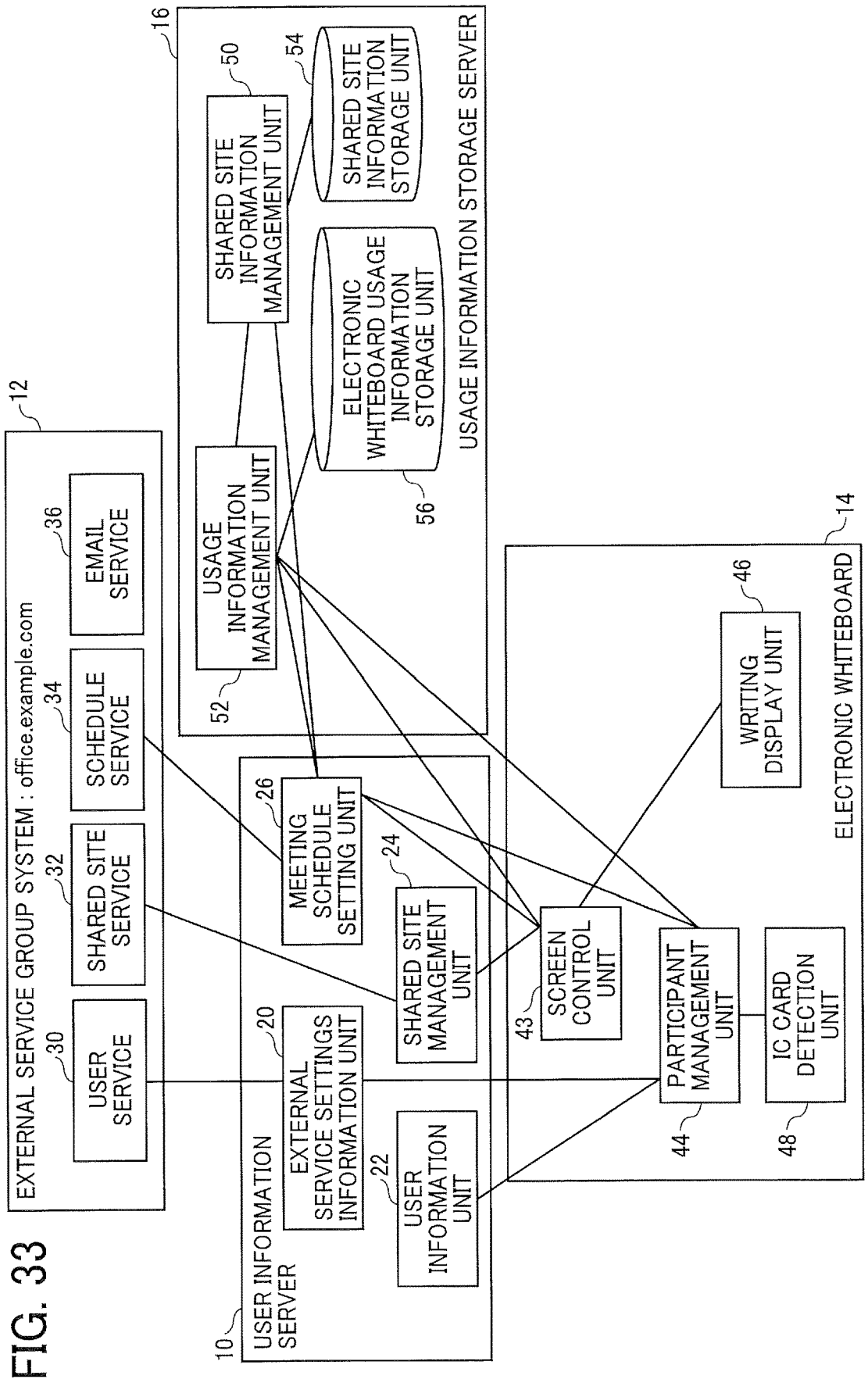
FIG. 33 is a diagram illustrating another example of the functional configuration of the information processing system according to embodiments of the present disclosure.

The functional configuration of the information processing system 1 may be as illustrated in FIG. 33, in alternative to the example illustrated in FIG. 4 according to the first and second embodiments. FIG. 33 is a diagram illustrating an example of the functional configuration of the information processing system according to the present embodiment. In the information processing system 1 of FIG. 33, the functions of the meeting schedule setting unit 40 and the shared site management unit 42 illustrated in FIG. 4 are transferred from the electronic whiteboard 14 to the user information server 10. The functional block diagram of FIG. 33 is the same as the functional block diagram of FIG. 4 except for a few part, and therefore the description thereof is appropriately omitted.

The electronic whiteboard 14 illustrated in FIG. 33 includes a screen control unit 43, a participant management unit 44, a writing display unit 46, and an IC card detection unit 48. Further, the user information server 10 includes an external service settings information unit 20, a user information unit 22, a shared site management unit 24 and a meeting schedule setting unit 26.

The screen control unit 43 of the electronic whiteboard 14 uses the shared site management unit 24 and the meeting schedule setting unit 26 of the user information server 10 to implement the same function as the shared site management unit 42 and the meeting schedule setting unit 40 of FIG. 4. The electronic whiteboard 14 accesses the shared site service 32 and the schedule service 34 through the user information server without acquiring the external service authentication token from the user information server 10, for example.

Further, the extraction condition of the suggested shared site of the first embodiment and the extraction condition of the suggested shared site of the second embodiment may be used in combination. Note that improvement of accuracy of searching for suggested shared site in regular meetings and routine work meetings may be expected by using the suggested shared site extraction conditions of the first embodiment. Also, improvement of accuracy of searching for suggested shared site for a project meeting or a meeting for a customer may be expected by using the suggested shared site extraction conditions of the second embodiment.

When a shared site available to the schedule owner is searched using the authentication token of the schedule owner or the meeting organizer, search result (at least the shared site name) is viewed by other meeting participants since the electronic whiteboard 14 is a shared terminal. It may not be preferable in terms of security, for example, when an outside participant is included in the meeting and view the searched shared site information.

However, in the present embodiment, since it is possible to display in addition to the schedule owner or the organizer of the meeting, the currently selected schedule information (schedule name or participant) and shared sites used in past meetings that match at least a part of the schedule information (shared site associated with electronic whiteboard information), security is ensured by preventing the information of the shared site from being unnecessarily viewed by other meeting participants.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure. Any one of the above-described operations may be performed in various other ways, for example, in an order different from the one described above. The information processing system 1 described in the above embodiments is just an example, and there may be various system configurations depending on applications or purposes.

Each function of the embodiments described above can be implemented by one or a plurality of processing circuitry.

Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The apparatuses described in the examples are merely an illustration of one of several computing environments for implementing the embodiments disclosed herein.

In some embodiments, the user information server 10 and the usage information storage server 16 includes multiple computing devices, such as a server cluster. The plurality of computing devices are configured to communicate with one another through any type of communication link, including a network 18, shared memory, etc., and perform the processes disclosed herein. Similarly, the electronic whiteboard 14 may include multiple computing devices configured to communicate with one another.

Furthermore, the user information server 10, the electronic whiteboard 14, and the usage information storage server 16 may be configured to share the disclosed processing steps in various combinations. For example, a process executed by a particular unit may be executed by the electronic whiteboard 14. Similarly, the function of the particular unit may be executed by the electronic whiteboard 14. The components of the user information server 10, the usage information storage server 16, and the electronic whiteboard 14 may be combined into one server or may be divided into a plurality of apparatuses.

The electronic whiteboard 14 may be, for example, an output device such as a projector, a digital signage, a head up display device, an industrial machine, an imaging device, a sound collecting device, a medical device, a network home appliance, a car (connected car), a mobile phone, a game machine, a personal digital assistant (PDA), a digital camera, a wearable PC, or the like.

What is claimed is:

1. An information processing apparatus comprising:
   circuitry configured to:
      detect a user;
      acquire schedule information of the user based on the detected user;
      suggest one or more shared sites to use according to the schedule information;
      identify the one or more shared sites to suggest based on the schedule information associating a schedule name, a schedule owner, an invitee, and the shared site; and
      suggest the one or more shared sites ranked based on the schedule information associating the schedule name, the schedule owner, the invitee, and the shared site.

2. The information processing apparatus of claim 1, wherein the circuitry is further configured to:
      accept an operation to add a user of the shared site as an invitee based on information on the user of the shared site acquired from an external service by using external service settings information associated with the detected user.

3. The information processing apparatus of claim 1, wherein the circuitry is further configured to:
      suggest at first priority the shared site associated with the selected schedule name and the selected schedule owner.

4. The information processing apparatus of claim 3, wherein when a plurality of shared sites associated with the selected schedule name and the selected schedule owner are identified, the circuitry is further configured to:
      suggest either one of most recently used shared site and most frequently used shared site at the first priority among the plurality of shared sites associated with the selected schedule name and the selected schedule owner.

5. The information processing apparatus of claim 3, wherein the circuitry is further configured to:
      accept selection of the one or more suggested shared sites to be used and selection of the one or more schedules by a single operation by the user.

6. The information processing apparatus of claim 5, wherein the circuitry is further configured to:
      suggest the shared site suggested at the first priority as a default selection.

7. The information processing apparatus of claim 1, wherein the circuitry is further configured to:
      suggest a storage destination of the shared site to be used based on the storage destination of the shared site of the schedule associated with the shared site used by the information processing apparatus.

8. The information processing apparatus of claim 1, wherein the circuitry is further configured to:
      suggest the one or more shared sites identified based on the schedule name, information associating the shared site selected by the user, a keyword used to search the shared site, and search result by the keyword.

9. The information processing apparatus of claim 8, wherein the circuitry is further configured to:
      suggest at first priority, either one of the shared site most recently used and the shared site most frequently used among a plurality of the shared sites.

10. An information processing system comprising an information processing apparatus, the information processing system comprising:
    at least one memory configured to;
       store user information and information on a shared site used by the information processing apparatus; and
    circuitry configured to:
       detect a user;
       acquire schedule information of the user based on the detected user; and
       suggest one or more shared sites to be used from information of the used shared site stored in the memory according to the schedule information;
       identify the one or more shared sites to suggest based on the schedule information associating a schedule name, a schedule owner, an invitee, and the shared site; and
       suggest the one or more shared sites ranked based on the schedule information associating the schedule name, the schedule owner, the invitee, and the shared site.

11. An information processing method comprising:
    detecting a user;
    acquiring schedule information of the user based on the user detected by the detecting;
    suggesting one or more shared sites to be used according to the schedule information;
    identifying the one or more shared sites to suggest based on the schedule information associating a schedule name, a schedule owner, an invitee, and the shared site; and suggesting the one or more shared sites ranked based on the schedule information associating the schedule name, the schedule owner, the invitee, and the shared site.

* * * * *